(12) United States Patent
Noh et al.

(10) Patent No.: US 9,179,464 B2
(45) Date of Patent: Nov. 3, 2015

(54) METHOD AND DEVICE FOR TRANSMITTING REFERENCE SIGNAL IN WIRELESS COMMUNICATION SYSTEM

(75) Inventors: Min Seok Noh, Anyang-si (KR); Moon Il Lee, Anyang-si (KR); Seung Hee Han, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 376 days.

(21) Appl. No.: 13/642,498

(22) PCT Filed: Apr. 20, 2011

(86) PCT No.: PCT/KR2011/002842
§ 371 (c)(1),
(2), (4) Date: Dec. 28, 2012

(87) PCT Pub. No.: WO2011/132942
PCT Pub. Date: Oct. 27, 2011

(65) Prior Publication Data
US 2013/0195034 A1 Aug. 1, 2013

Related U.S. Application Data

(60) Provisional application No. 61/326,204, filed on Apr. 20, 2010.

(30) Foreign Application Priority Data

Apr. 20, 2011 (KR) .................. 10-2011-0036839

(51) Int. Cl.
*H04W 72/04* (2009.01)
*H04L 5/00* (2006.01)
*H04L 27/26* (2006.01)

(52) U.S. Cl.
CPC ......... *H04W 72/0466* (2013.01); *H04L 5/0053* (2013.01); *H04L 27/2611* (2013.01)

(58) Field of Classification Search
None
See application file for complete search history.

(56) References Cited

U.S. PATENT DOCUMENTS

| | | | |
|---|---|---|---|
| 8,873,362 B2 * | 10/2014 | Papasakellariou et al. ... | 370/203 |
| 2003/0103447 A1 * | 6/2003 | Thorson et al. ............... | 370/209 |
| 2009/0201863 A1 | 8/2009 | Pi | |
| 2009/0279493 A1 * | 11/2009 | Gaal et al. ..................... | 370/329 |
| 2010/0260059 A1 * | 10/2010 | Zhang et al. .................. | 370/252 |

FOREIGN PATENT DOCUMENTS

| | | |
|---|---|---|
| KR | 1020100002108 | 1/2010 |
| KR | 1020100035565 | 4/2010 |

* cited by examiner

*Primary Examiner* — Ian N Moore
*Assistant Examiner* — Eric P Smith
(74) *Attorney, Agent, or Firm* — Lee, Hong, Degerman, Kang & Waimey

(57) ABSTRACT

A method and device for transmitting a reference signal in a wireless communication system is provided. A base station maps each demodulation reference signal (DMRS) of each of a plurality of layers into a first resource element (RE) set and a second RE set including four REs over four orthogonal frequency division multiplexing (OFDM) symbols within a subframe, allocates first orthogonal cover codes (OCCs) having a length of 4 to each DMRS mapped into the first RE set, allocates second OCCs having a length of 4 to each DMRS mapped into the second resource element set and transmits each DMRS mapped into the first RE set and the second RE set. The subframe includes two slots and each slot includes six OFDM symbols. The second OCC are formed by swapping positions of bits that constitute the first OCCs.

11 Claims, 26 Drawing Sheets

METHOD AND DEVICE FOR TRANSMITTING REFERENCE SIGNAL IN WIRELESS COMMUNICATION SYSTEM

CROSS-REFRENCE TO RELATED APPLICATIONS

This application is the National filing under 35 U.S.C. 371 of International Application No. PCT/KR2011/002842, filed on Apr. 20, 2011, which claims the benefit of earlier filing date and right of priority to Korean Patent Application No. 10-2011-0036839, filed on Apr. 20, 2011, and also claims the benefit of U.S. Provisional Application Ser. No. 61/326,204, filed on Apr. 20, 2010, the contents of which are all hereby incorporated by reference herein in their entirety.

BACKGROUND OF THE INVENTION

1. Field of the Invention

The present invention relates to wireless communication and, more particularly, to a method and apparatus for transmitting a reference signal in a wireless communication system.

2. Related Art

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+ n. Here, since the receiver already knows the reference signal p, it can estimate a channel information value $\hat{h}$ using Equation 1 in the case in which a Least Square (LS) method is used.

$$\hat{h} = h + n/p = h + \hat{n} \qquad [\text{Equation 1}]$$

The accuracy of the channel estimation value $\hat{h}$ estimated using the reference signal p is determined by the value $\hat{n}$. To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

A downlink RS may include a cell-specific RS (CRS), a multicast-broadcast single frequency network (MBSFN) RS, a UE-specific RS, a positioning RS (PRS), and a channel state information RS (CSI-RS). The UE-specific RS is an RS received by a specific UE or a specific UE group within a cell. The UE-specific RS is chiefly used for the data demodulation of a specific UE or a specific UE group and thus may be called a demodulation RS (DMRS).

Meanwhile, a plurality of DMRSs with respect to a plurality of layers may be transmitted. The plurality of DMRSs with respect to the plurality of layers may be mapped to resource elements (REs) of a resource block, and the DMRSs mapped to the resource elements may be transmitted via a plurality of antenna ports. The $3^{rd}$ generation partnership project (3GPP) long term evolution advanced LTE-A) supports a maximum of eight layers. The plurality of DMRSs of the plurality of layers may undergo precoding, or the like, and subsequently transmitted through a plurality of antenna ports.

In transmitting the plurality of DMRSs of the plurality of layers through the plurality of antenna ports, transmission power to be allocated to the plurality of antenna ports is required to be evenly distributed. Thus, a method for transmitting the precoded DMRSs with uniform transmission power may be proposed.

SUMMARY OF THE INVENTION

The present invention provides a method and apparatus for transmitting a reference signal in a wireless communication system. In particular, a method for evenly distributing transmission power allocated to a plurality of antenna ports in transmitting a plurality of DMRS of a plurality of layers through a plurality of antenna ports is provided.

In an aspect, a method for transmitting a reference signal in a wireless communication system is provided. The method includes mapping respective demodulation reference signals (DMRSs) of a plurality of layers to a first resource element set and a second resource element set, the first resource element set and the second resource element set including, respectively, four resource elements (REs) occupying four orthogonal frequency division multiplexing (OFDM) symbols within a subframe, allocating a first orthogonal cover code (OCC) having a length of 4 to the respective DMRSs mapped to the first resource element set, allocating a second OCC having a length of 4 to the respective DMRSs mapped to the second resource element set, and transmitting the DMRSs mapped to the first resource element set and the second resource element set, wherein the subframe includes two slots and each slot includes six OFDM symbols, and the second OCC is obtained by swapping positions of bits constituting the first OCC.

The number of the plurality of layers may be a maximum of 4.

The four OFDM symbols may be fifth, sixth, eleventh, and twelfth OFDM symbols of the subframe.

The first resource element set and the second resource element set may include two pairs of resource elements including resource elements corresponding to two adjacent OFDM symbols and the same subcarrier.

The first resource element set and the second resource element set may have certain subcarrier intervals within respective OFDM symbols.

The second OCC may be obtained by swapping positions of bits constituting the first OCC in a slot unit or a subframe unit.

The second OCC may be obtained by swapping the positions of bits constituting the first OCC by cycling the first OCC to the left or right.

The method may further include mapping respective DMRSs of a plurality of layers other than the plurality of layers to a third resource element set and a fourth resource element set including four resource elements occupying four OFDM symbols within a subframe, allocating a third OCC having a length of 4 to the respective DMRSs mapped to the third resource element set, allocating a fourth OCC having a length of 4 to the respective DMRSs mapped to the fourth resource element set, and transmitting the DMRSs mapped to the third resource element set and the fourth resource element set, wherein the fourth OCC is obtained by swapping positions of bits constituting the third OCC.

The third resource element set and the fourth resource element set may include two pairs of resource elements including resource elements corresponding to two adjacent OFDM symbols and the same subcarrier.

The first resource element set and the third resource element set may be adjacent in a frequency domain within respective OFDM symbols, and the second resource element set and the fourth resource element set may be adjacent in a frequency domain within respective OFDM symbols.

The third OCC and the fourth OCC may be obtained by swapping positions of the bits constituting the first OCC and the positions of bits constituting the second OCC to the left or right by an offset.

The offset may be previously determined.

In another aspect, a method for demodulating data in a wireless communication system is provided. The method includes receiving respective demodulation reference signals (DMRSs) of a plurality of layers mapped to a first resource element set and a second resource element set including four resource elements occupying four orthogonal frequency division multiplexing (OFDM) symbols within a subframe, so as to be transmitted, and processing the respective DMRSs to perform data demodulation, wherein the subframe includes two slots and each slot includes six OFDM symbols, a first orthogonal cover code (OCC) having a length of 4 is allocated to the respective DMRSs mapped to the first resource element set, a second OCC having a length of 4 is allocated to the respective DMRSs mapped to the second resource element set, and the second OCC is obtained by swapping positions of bits constituting the first OCC.

In another aspect, a user equipment (UE) in a wireless communication system is provided. The UE includes a radio frequency (RF) unit configured to transmit or receive a radio signal, and a processor connected to the RF unit, and configured to receive respective demodulation reference signals (DMRSs) of a plurality of layers mapped to a first resource element set and a second resource element set including four resource elements occupying four orthogonal frequency division multiplexing (OFDM) symbols within a subframe, so as to be transmitted, and process the respective DMRSs to perform data demodulation, wherein the subframe includes two slots and each slot includes six OFDM symbols, a first orthogonal cover code (OCC) having a length of 4 is allocated to the respective DMRSs mapped to the first resource element set, a second OCC having a length of 4 is allocated to the respective DMRSs mapped to the second resource element set, and the second OCC is obtained by swapping positions of bits constituting the first OCC.

According to embodiments of the present invention, since transmission power allocated to a plurality of antenna ports is evenly distributed, implementation costs and complexity can be reduced.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
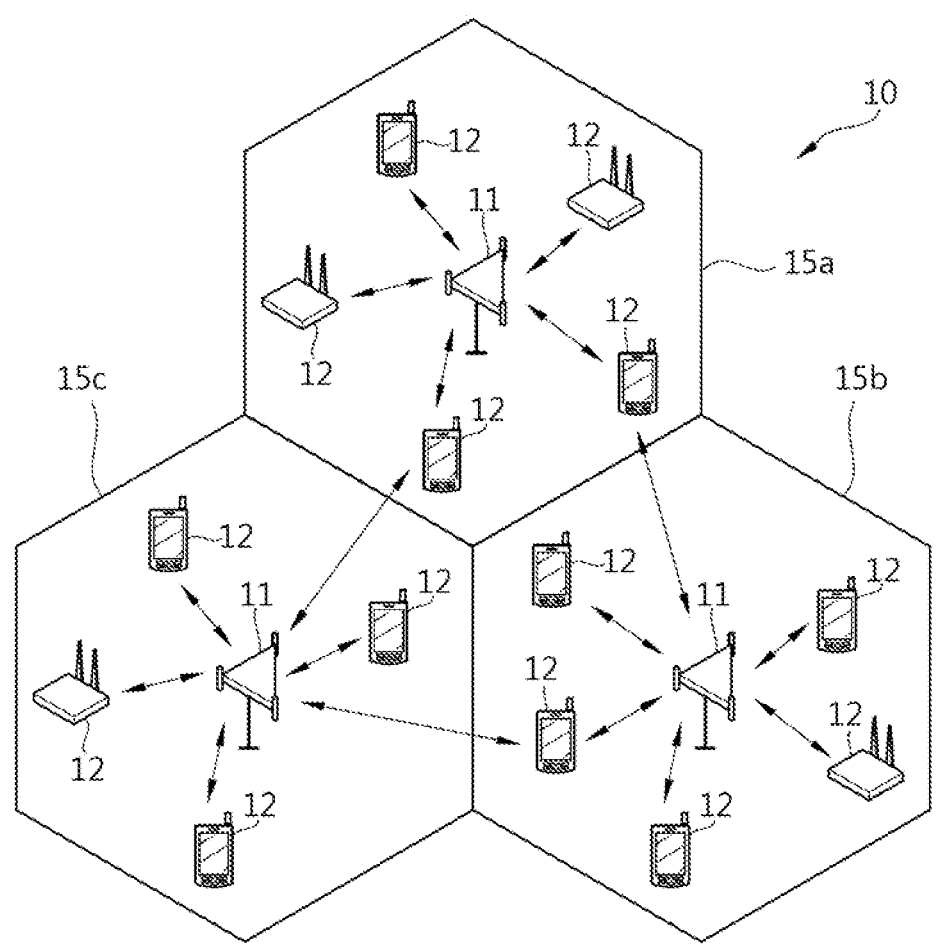
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
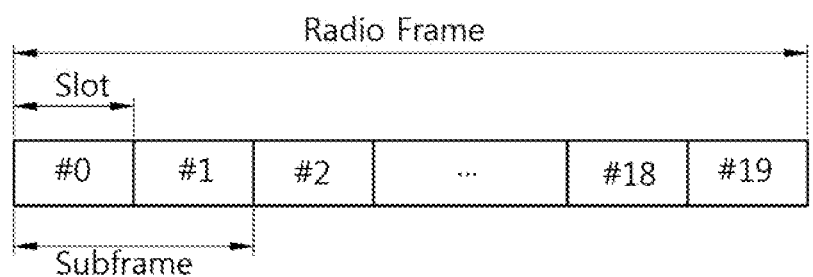
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
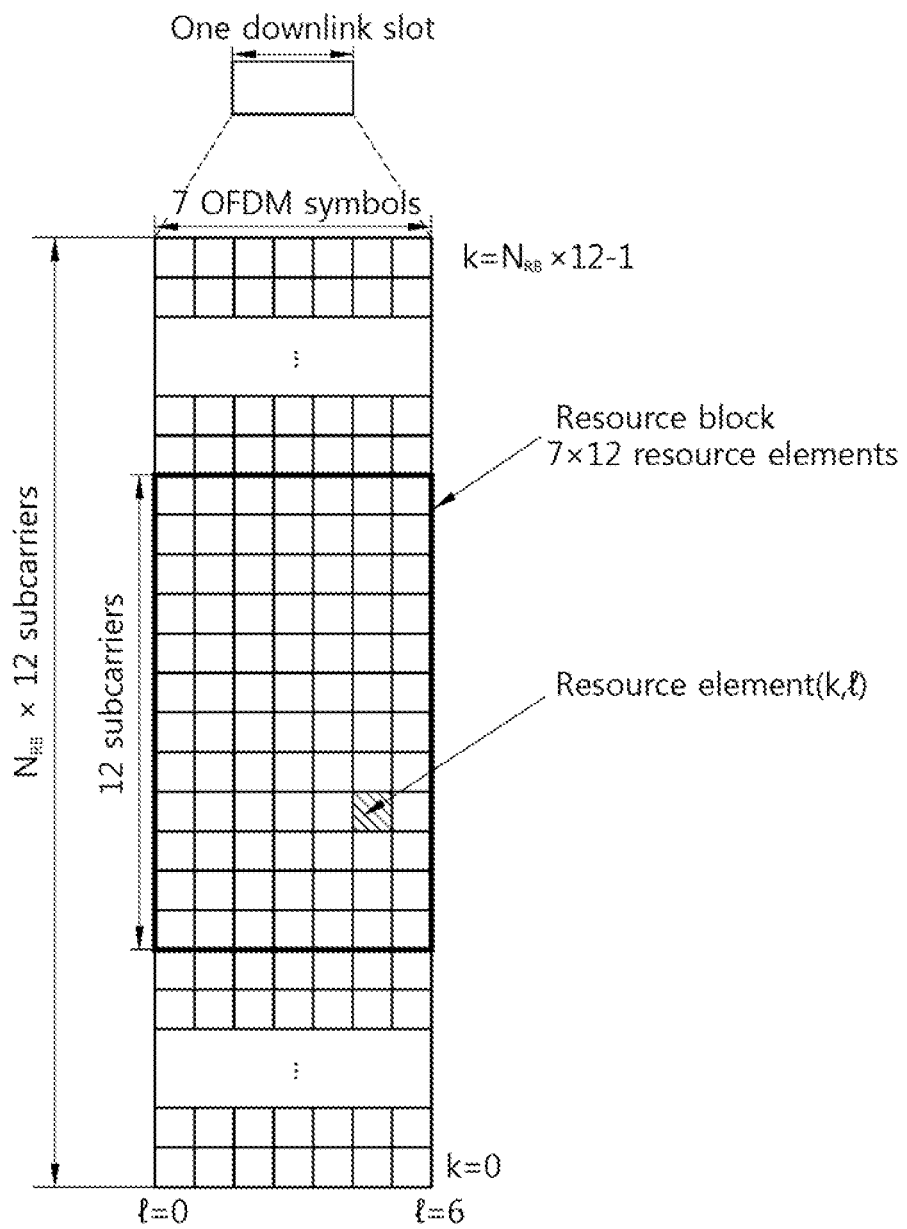
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
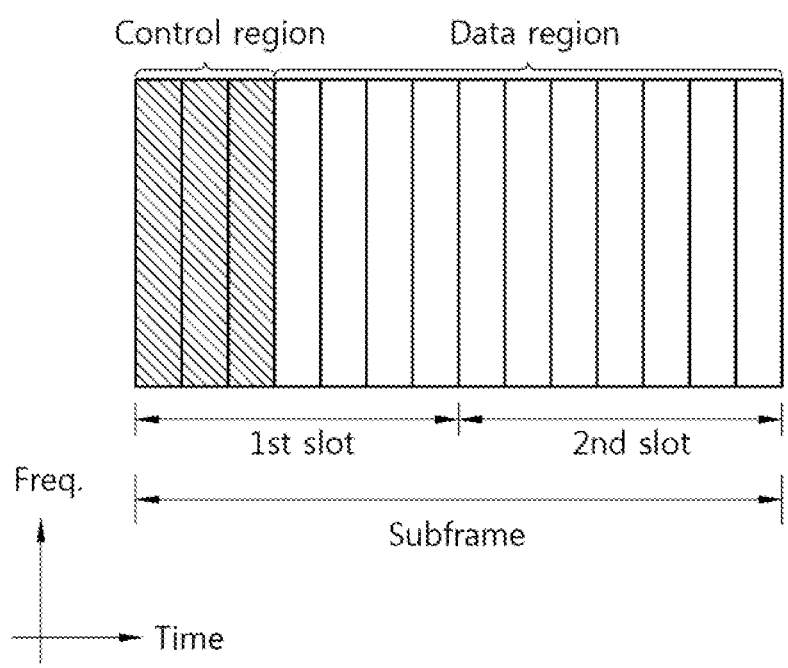
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
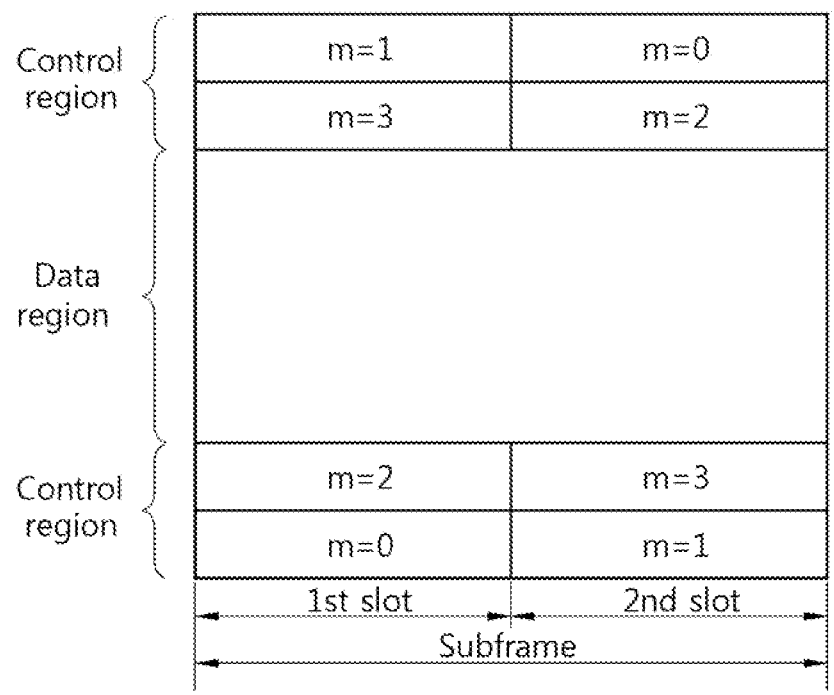
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUSCH) for transmitting data is allocated to the data region. If indicated by a higher layer, the user equipment may support simultaneous transmission of the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A reference signal can be classified into a cell-specific reference signal (CRS), a multicast-broadcast single frequency network (MBSFN) reference signal, a user equipment (UE)-specific reference signal, a position reference signal (PRS) and a channel state information reference signal (CSI-RS).

Hereinbelow, a CRS and a DRS in LTE rel-8/9 are described.

First, a CRS is described. The CRS is transmitted to all the UEs within a cell and used for channel estimation. The CRS may be transmitted all downlink subframes within a cell which supports the PUSCH transmission.

Figure 6:
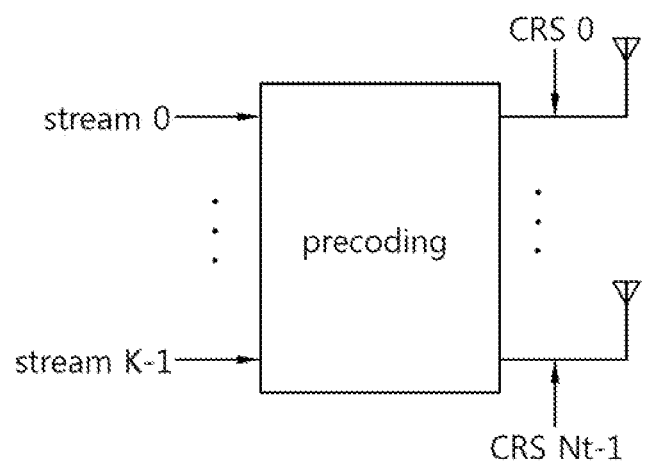
FIG. 6 is a block diagram of a transmitter for transmitting a CRS.

FIG. 6 is a block diagram of a transmitter for transmitting a CRS.

Generally, since a precoder is used for a signal for a specific UE, and the CRS is transmitted to all UEs, the CRS may not be encoded by the procoder in the transmitter shown in FIG. 6. However, if there is a cell specific precoder in a specific system, the precoder may be operated as a device for virtualization, not the precoder.

Figure 7:
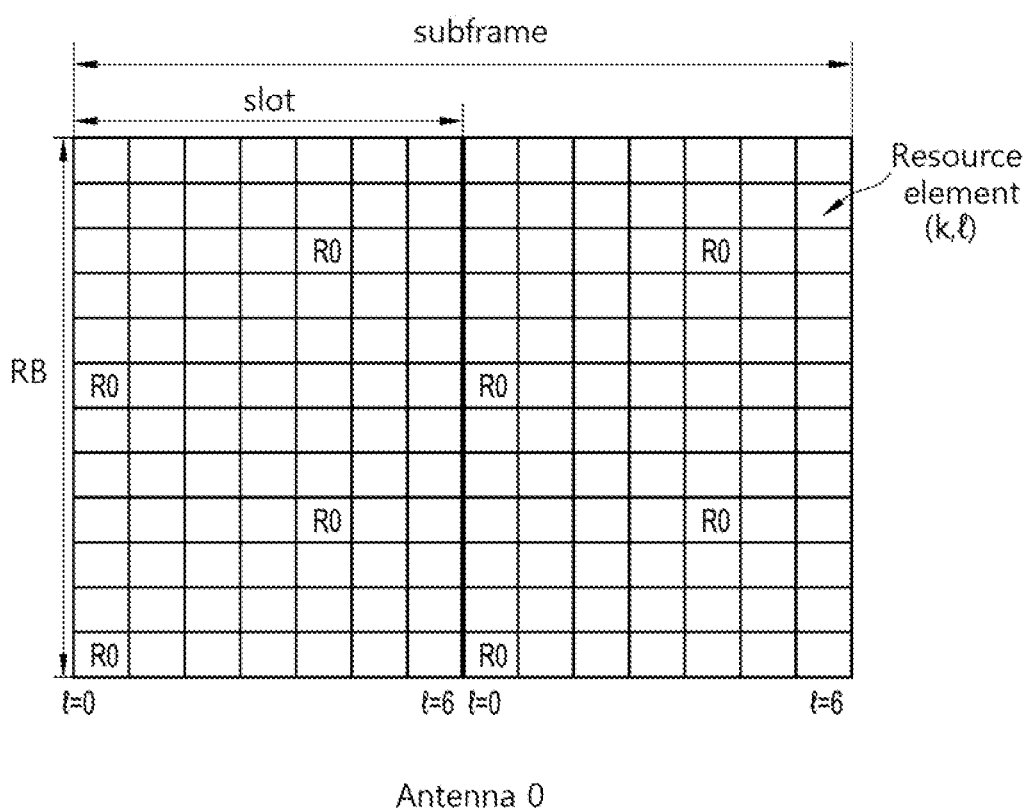
FIGS. 7 to 9 show example of patterns in which CRSs are mapped to an RB.
Figure 8:
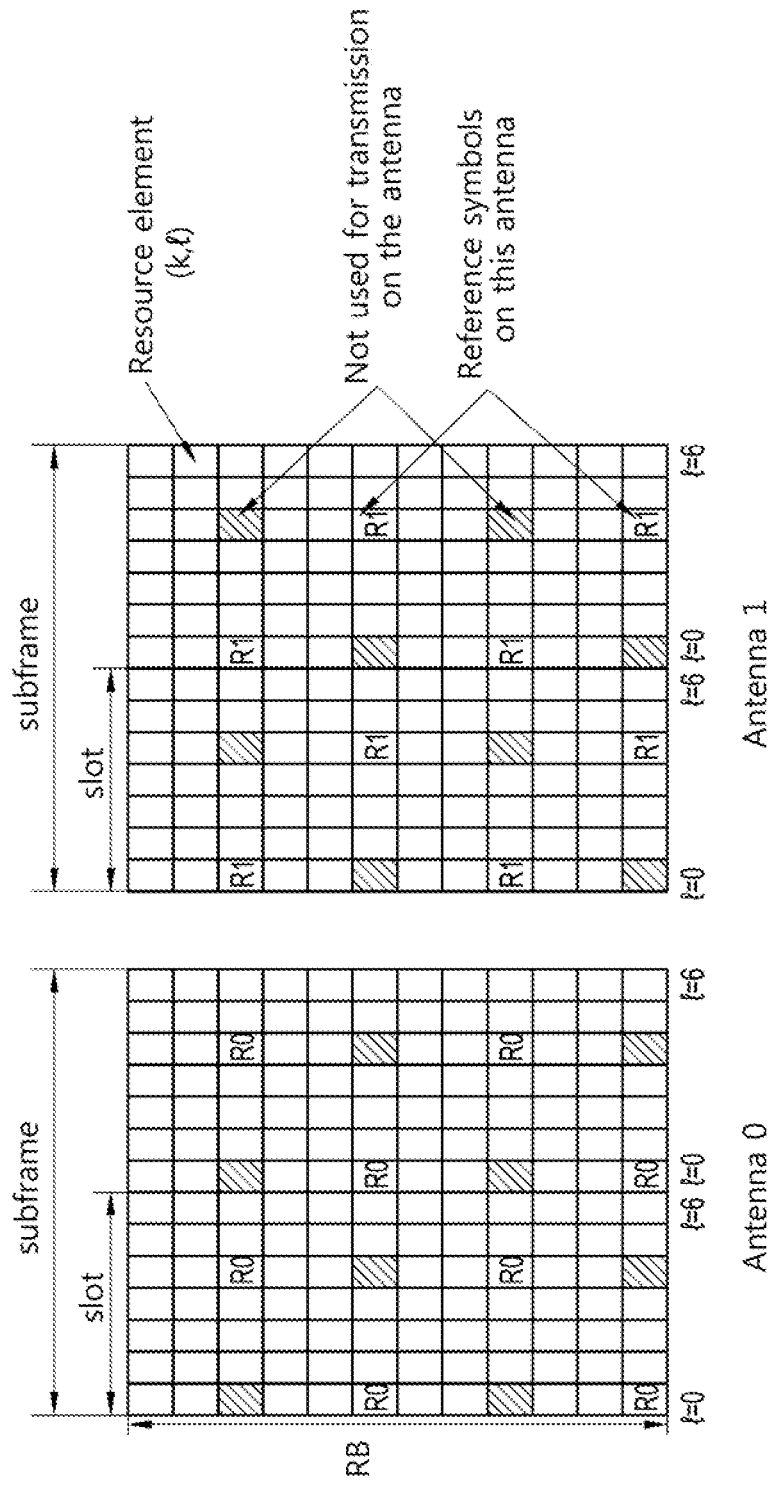
Figure 9:
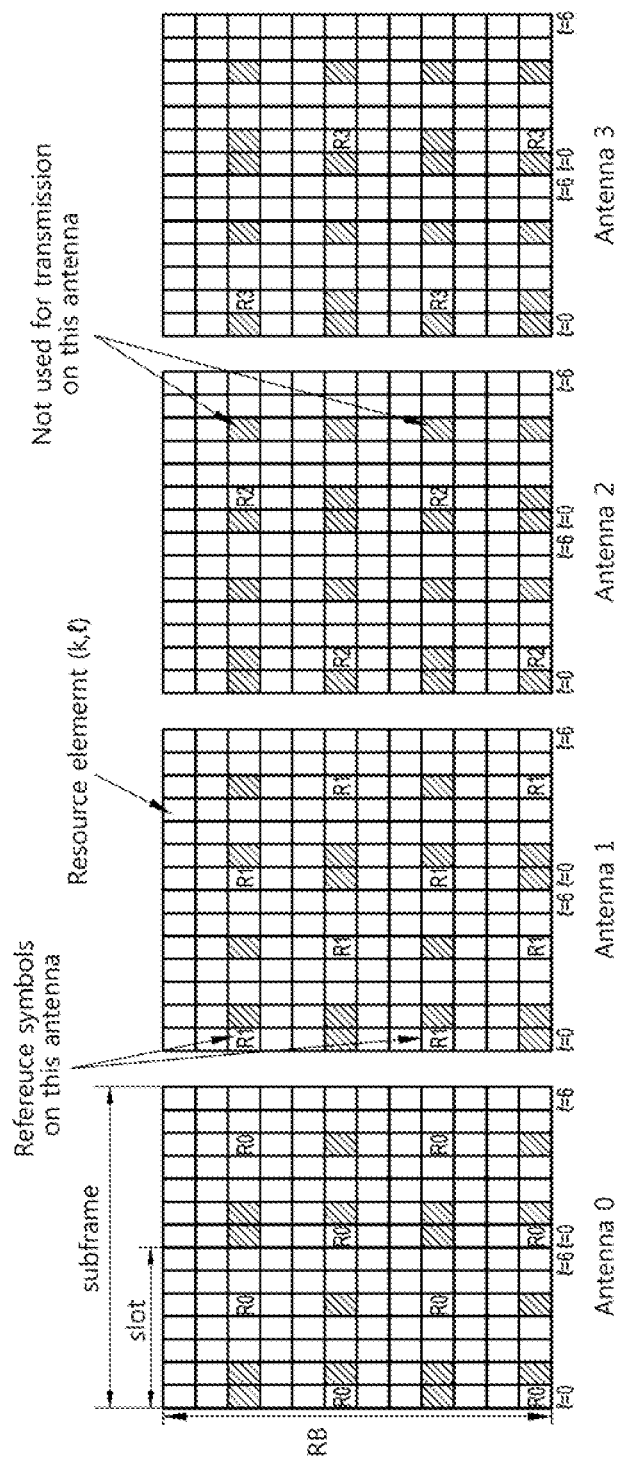

FIGS. 7 to 9 show example of patterns in which CRSs are mapped to an RB.

FIG. 7 shows an example of a pattern in which CRSs are mapped to an RB when a BS uses one antenna. FIG. 8 shows an example of a pattern in which CRSs are mapped to an RB when a BS uses two antennas. FIG. 9 shows an example of a pattern in which CRSs are mapped to an RB when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc. Also, the CRS may be used for a channel quality estimation, a CP detection, time/frequency synchronization, etc.

Referring to FIG. 7 to FIG. 9, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index t, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2 \times N_{RB}$. Therefore, a length of the CRS sequence is $2 \times N_{RB}$.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1))$$ [Equation 2]

Herein, m is 0, 1, ..., $2N_{RB}^{max}-1$. $N_{RB}^{max}$ denotes the number of resource blocks corresponding to a maximum bandwidth. For example, when using a 3GPP LTE system, $N_{RB}^{max}$ is 110. c(i) denotes a PN sequence as a pseudorandom sequence, and can be defined by a gold sequence having a length of 31. Equation 3 shows an example of a gold sequence c(n).

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$ [Equation 3]

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $2N_{RB}^{max}$, a certain part with a length of $2 \times N_{RB}$ can be selected from an RS sequence generated in a length of $2 \times N_{RB}^{max}$.

An MBSFN reference signal, a reference signal for providing a multimedia broadcast multicast service (MBMS), may be transmitted in a subframe allocated for MBSFN transmission. The MBSFN reference signal may be defined only in an extended CP structure.

Hereinafter, a UE-specific reference signal will be described. The UE-specific reference signal is a reference signal received by a specific terminal within a cell or a specific UE group, which may also be called a dedicated reference signal (DRS). Alternatively, the UE-specific reference signal may also be called a demodulation reference signal (DMRS) because it is used for data demodulation of a specific UE or a specific UE group.

Figure 10:
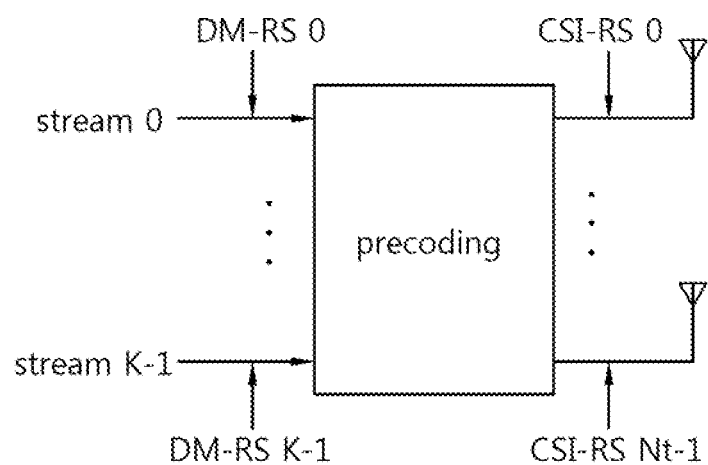
FIG. 10 is a block diagram of a transmitter for transmitting a DRS.

FIG. 10 is a block diagram of a transmitter for transmitting a DRS.

The DRS may be divided into a precoded RS and a non-precoded RS. In FIG. 10, the DRS is assumed to be a precoded RS. A DRS with respect to each stream is precoded through precoding used for a data symbol, and the same number of reference signal sequences corresponding to the number of streams may be transmitted. Here, number K of the streams may be equal to or smaller than number Nt of physical antenna ports.

Figure 11:
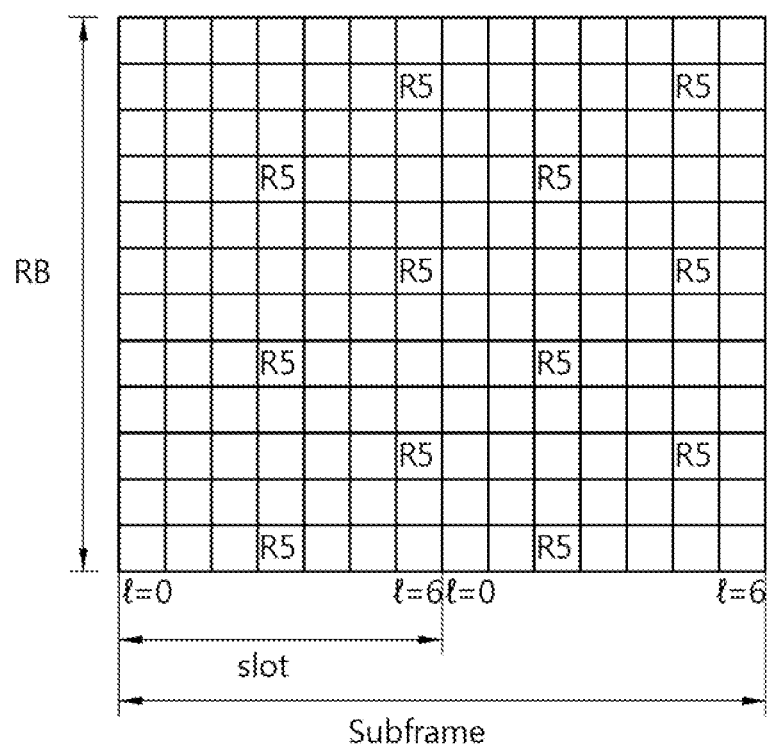
FIG. 11 and FIG. 12 show example of patterns in which DRSs are mapped to an RB.
Figure 12:
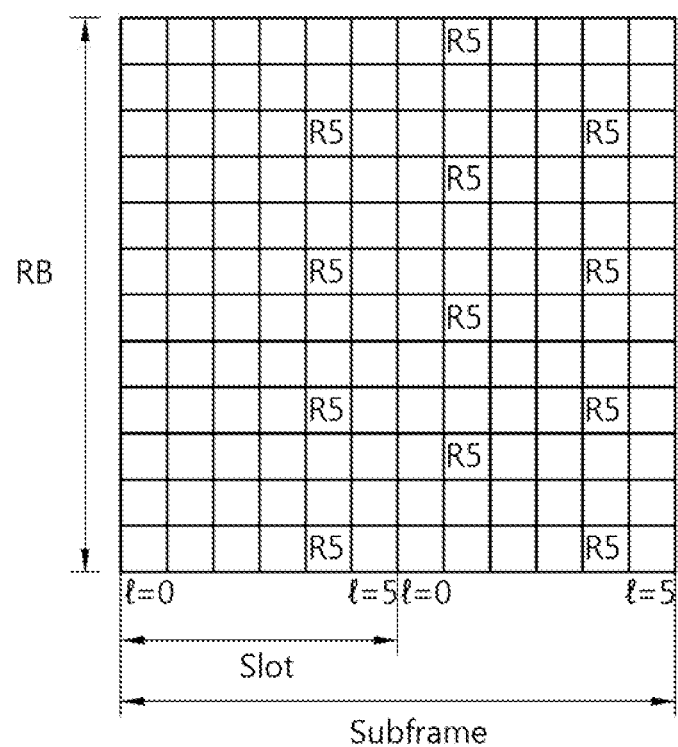

FIG. 11 and FIG. 12 show example of patterns in which DRSs are mapped to an RB.

FIG. 11 shows an example of a pattern in which DRSs are mapped to an RB in a normal CP structure. In the normal CP structure, a subframe includes 14 OFDM symbols. R5 indicates the reference signal of an antenna which transmits a DRS. On one OFDM symbol including a reference symbol, a reference signal subcarrier is positioned at intervals of four subcarriers. FIG. 12 shows an example of a pattern in which DRSs are mapped to an RB in an extended CP structure. In the extended CP structure, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008-03).

The position of a frequency domain and the position of a time domain within the subframe of a DRS can be determined by a resource block assigned for PDSCH transmission. A DRS sequence can be determined by a UE ID, and only a specific UE corresponding to the UE ID can receive a DRS.

A DRS sequence can be obtained using Equations 2 and 3. However, m in Equation 2 is determined by $N_{RB}^{PDSCH}$. $N_{RB}^{PDSCH}$ is the number of resource blocks corresponding to a bandwidth corresponding to PDSCH transmission. The length of a DRS sequence can be changed according to $N_{RB}^{PDSCH}$. That is, the length of a DRS sequence can be changed according to the amount of data assigned to a UE. In Equation 2, a first m-sequence $x_1(i)$ or a second m-sequence $x_2(i)$ can be reset according to a cell ID, the position of a subframe within one radio frame, a UE ID, etc. for every subframe.

A DRS sequence can be generated for every subframe and applied for every OFDM symbol. It is assumed that the number of reference signal subcarriers per resource block is 12 and the number of resource blocks is $N_{RB}^{PDSCH}$ within one subframe. The total number of reference signal subcarriers is $12 \times N_{RB}^{PDSCH}$. Accordingly, the length of the DRS sequence is $12 N \times N_{RB}^{PDSCH}$. In the case in which DRS sequences are generated using Equation 2, m is $0, 1, \ldots, 12 N_{RB}^{PDSCH} - 1$. The DRS sequences are sequentially mapped to reference symbols. The DRS sequence is first mapped to the reference symbol and then to a next OFDM symbol, in ascending powers of a subcarrier index in one OFDM symbol.

Further, the CRS can be used together with a DRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

Meanwhile, in LTE-A, in order to reduce overhead of a reference signal transmission, DRS-based downlink transmission may be performed. In CRS-based downlink transmission, a reference signal is always transmitted through every physical antenna port, and in the DRS-based downlink transmission, only a virtual antenna port requires a reference signal for coherent demodulation. Through DRS-based downlink transmission, overhead of reference signal transmission may be reduced. Here, in general, the number of virtual antenna ports may be equal to or smaller than the number of physical antenna ports. A DRS may be used only as a DMRS for demodulation, and an additional reference signal (CSI-RS) for estimating a channel state may be transmitted to a UE. Thus the CSI-RS may be transmitted at a predetermined period, and overhead of reference signal transmission may be reduced by sufficiently lengthening a transmission period of the CSI-RS.

Figure 13:
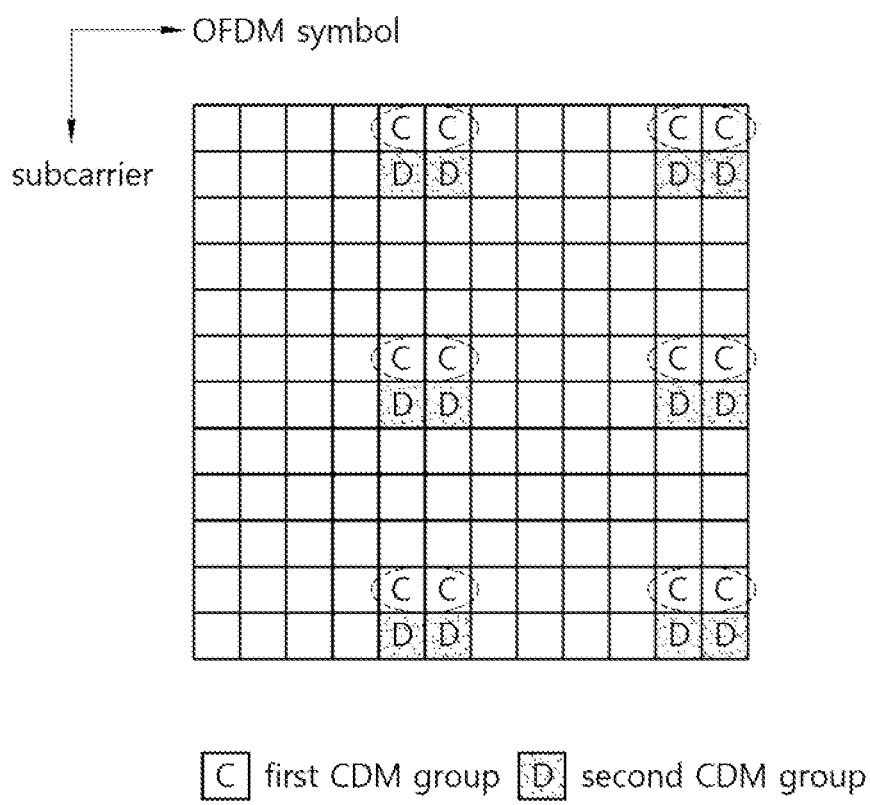
FIG. 13 shows an example of a pattern in which DMRSs are mapped to an RB in the LTE-A.

FIG. 13 shows an example of a pattern in which DMRSs are mapped to an RB in the LTE-A.

FIG. 13 shows a pattern for supporting DMRSs with respect to a maximum of four layers in an extended CP structure. Referring to FIG. 13, DMRSs with respect to a maximum of four layers may be mapped to two code division multiplexing (CDM) groups. The two CDM groups are expressed as a first CDM group 'C' and a second CDM group 'D'. The first CDM group and the second CDM group include a plurality of resource elements. In FIG. 13, the first CDM group includes resource elements corresponding to first, sixth, and eleventh subcarriers of fifth, sixth, eleventh, and twelfth OFDM symbols, and the second CDM group includes second, seventh, and twelfth subcarrier of fifth, sixth, eleventh, and twelfth OFDM symbols. However, resource elements included in the first CDM group and the second CDM group are not limited thereto. When a maximum of four layers are supported, DMRSs with respect to some two of four layers may be mapped to the first CDM group, and DMRSs with respect to the other remaining layers may be mapped to the second CDM group. For example, DMRSs with respect to layer 0 and layer 1 are mapped to the first CDM group, and DMRSs with respect to layer 2 and layer 3 may be mapped to the second CDM group. Namely, when the number of layers is up to 2, the DMRSs may be mapped to 16 resource elements included in the first CDM group, and when the number of layers is more than 2, the DMRSs may be mapped to 32 resource elements included in the first CDM group and the second CDM group. Also, DMRSs with respect to two layers mapped to the first CDM group and the second CDM group, respectively, may be multiplexed according to a CDM method by an orthogonal cover code (OCC). In multiplexing the DMRSs according to the CDM method, 2×2 Walsh spreading or 4×4 Walsh spreading may be used.

Figure 14:
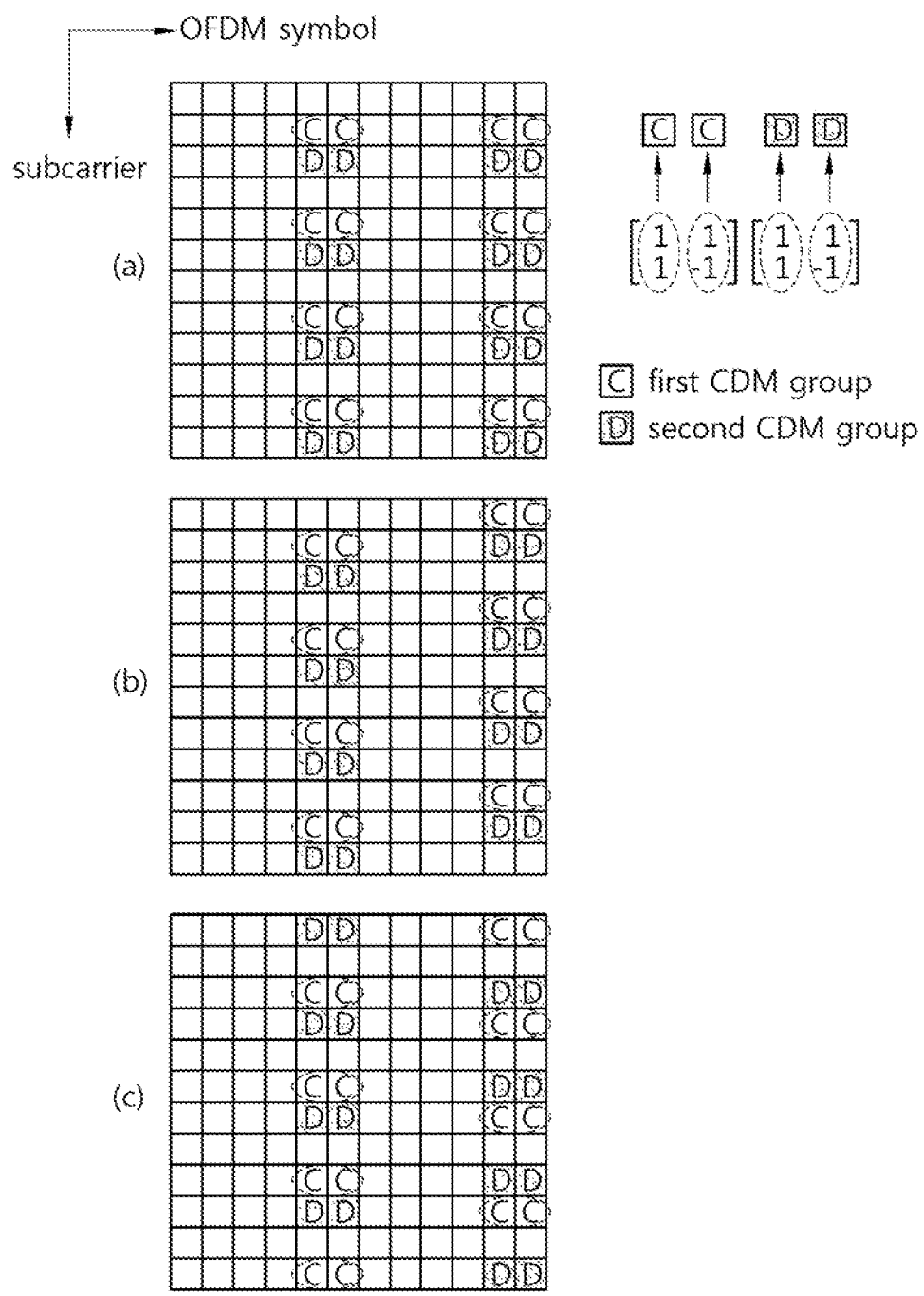
FIG. 14 shows another example of a pattern in which DMRSs are mapped to RBs in the LTE-A.

FIG. 14 shows another example of a pattern in which DMRSs are mapped to RBs in the LTE-A.

Like FIG. 13, FIG. 14 shows a pattern for supporting DMRSs with respect to a maximum of four layers in an extended CP structure. In FIG. 14, the first CDM group and the second CDM group includes resource elements of fifth, sixth, eleventh, and twelfth OFDM symbols like in FIG. 13. As shown in FIGS. 14(*a*) to 14(*c*), positions of resource elements in a frequency domain included in each CDM group may be various.

DMRSs with respect to the layers mapped to the first CDM group and the second CDM group may be multiplexed according to a CDM method by an OCC. In multiplexing the DMRSs according to the CDM method, 2×2 Walsh spreading or 4×4 Walsh spreading may be used. In FIG. 14, an OCC having a length of 2 applied to a DMRS of each layer is expressed. Different OCCs are allocated to DMRSs of two layers mapped to the first CDM group. For example, OCC [1 1] is allocated to resource elements of mutually adjacent OFDM symbols with respect to a DMRS of layer 0 mapped to the first CDM group and transmitted, and similarly, OCC [1 −1] is allocated to resource elements of mutually adjacent OFDM symbols with respect to a DMRS of layer 1 mapped to the first CDM group and transmitted. OCCs applied to DMRSs of respective layers may be expressed in a matrix form as shown in Equation 4 below.

$$W_2 = \begin{pmatrix} 1 & 1 \\ 1 & -1 \end{pmatrix} = (a \ b) \qquad \text{[Equation 4]}$$

In the matrix of Equation 4, each row represents a layer. Namely, in the matrix of Equation 4, a first row represents an OCC allocated to the DMRSs of the layer 0, and a second row represents an OCC allocated to the DMRSs of the layer 0. Also, in the matrix of Equation 4, each column represents a position of a resource element to which an OCC is allocated. For example, a value of a first column in FIG. 14 may be allocated to DMRSs mapped to the fifth OFDM symbol, and a value of a second column may be allocated to DMRSs mapped a sixth OFDM symbol.

Since the OCC is allocated in this manner, DMRSs of different layers mapped to the same resource elements may be discriminated. Also, the same OCC as that allocated to the DMRSs of the layer mapped to the first CDM group may also be allocated to the DMRSs of the layer mapped to the second CDM group.

Figure 15:
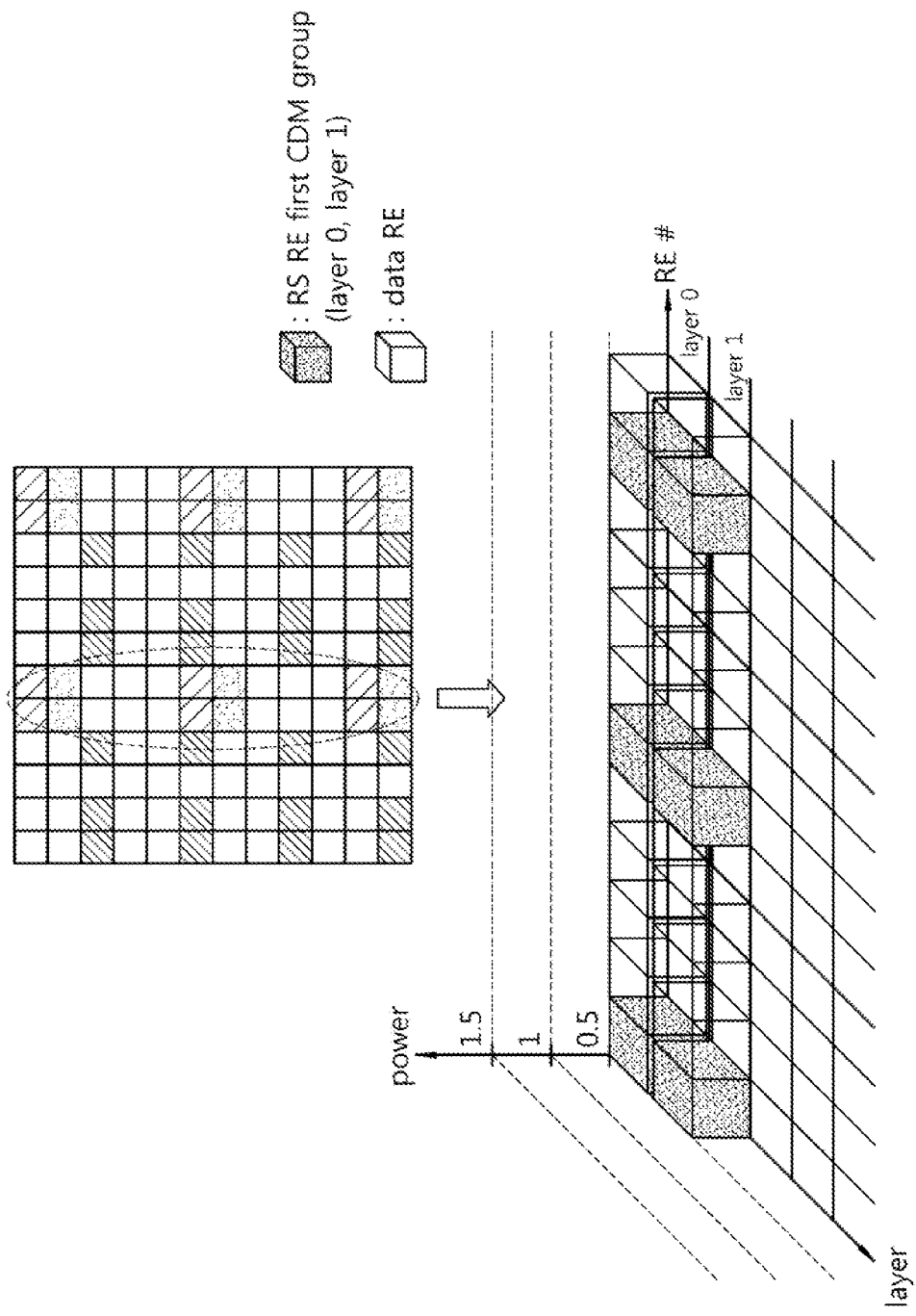
FIG. 15 shows an example of application of power to resource elements to which the DMRSs are mapped and resource elements to which data is mapped.

FIG. 15 shows an example of application of power to resource elements to which the DMRSs are mapped and resource elements to which data is mapped.

Specifically, FIG. 15 shows power allocated to DMRSs and data with respect to two layers when there are two ranks, namely, when there are two layers. DMRSs with respect to two layers are mapped in a single CDM group so as to be multiplexed and transmitted. Like the first CDM group in FIG. 13, DMRSs with respect to two layers mapped to resource elements corresponding to first, sixth, and eleventh subcarriers of fifth, sixth, eleventh, and twelfth OFDM symbols. Since precoding applied to resource elements to which data is mapped is also applied equally to the resource elements to which the DMRSs are mapped. A power ratio between data resource elements and DMRS resource elements are the same in the aspect of each layer. Thus, there is no need to signal information regarding the power ratio.

Figure 16:
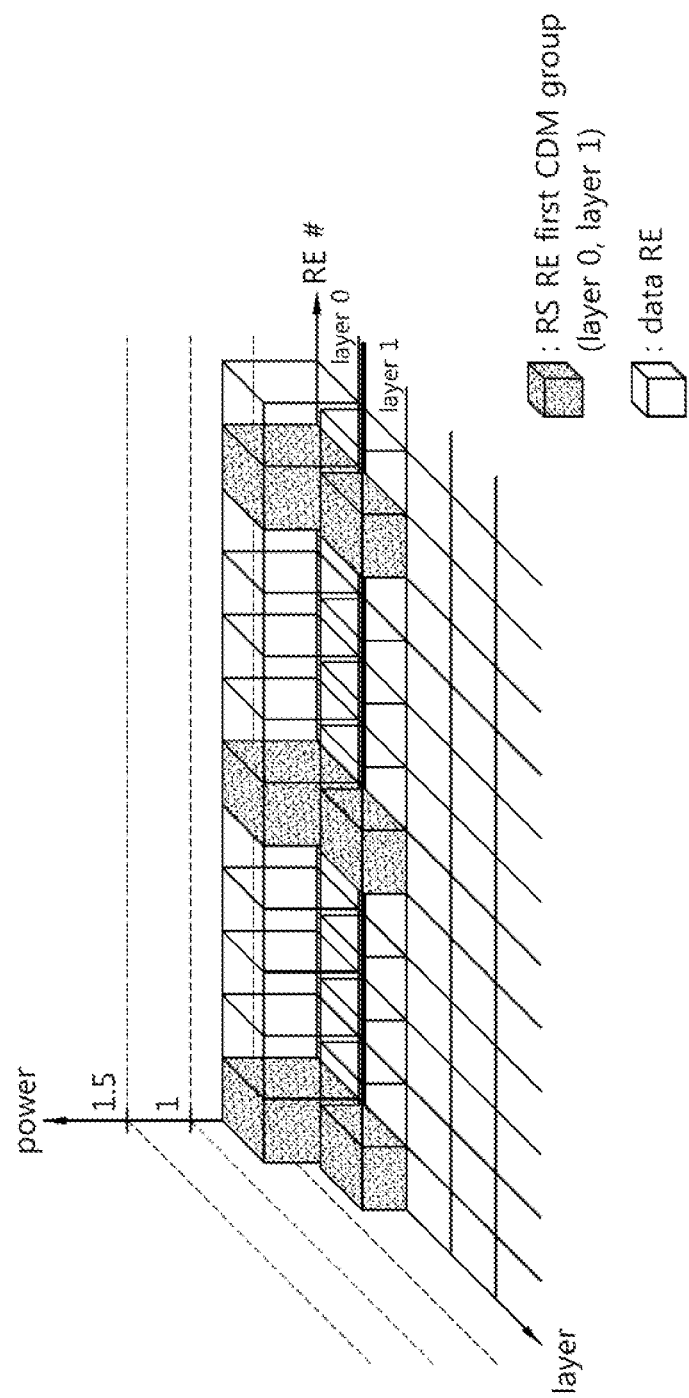
FIG. 16 shows another example of application of power to resource elements to which the DMRSs are mapped and resource elements to which data is mapped.

FIG. 16 shows another example of application of power to resource elements to which the DMRSs are mapped and resource elements to which data is mapped.

Like the case of FIG. 15, FIG. 16 shows power allocated to DMRSs and data with respect to two layers when there are two layers. By transmitting data and DMRSs with the same power, information regarding a ratio between data resource elements and DMRS resource elements may be implicitly provided to a UE. Thus, different power ratios may be applied to the two layers. In particular, as described above with reference to FIG. 14, when an OCC is allocated to DMRSs of the two layers mapped to a single CDM group, [1 1] may be continuously applied to the DMRSs of one layer and [1 −1] may be continuously applied to the DMRSs of the other layer. When power is compared by OFDM symbols in the entire RBs, power of DMRSs of a plurality of layers in the OFDM symbols to which −1 among the OCC values is applied may be canceled out. Thus, power between OFDM symbols may be unbalanced, and a solution thereto is required.

Figure 17:
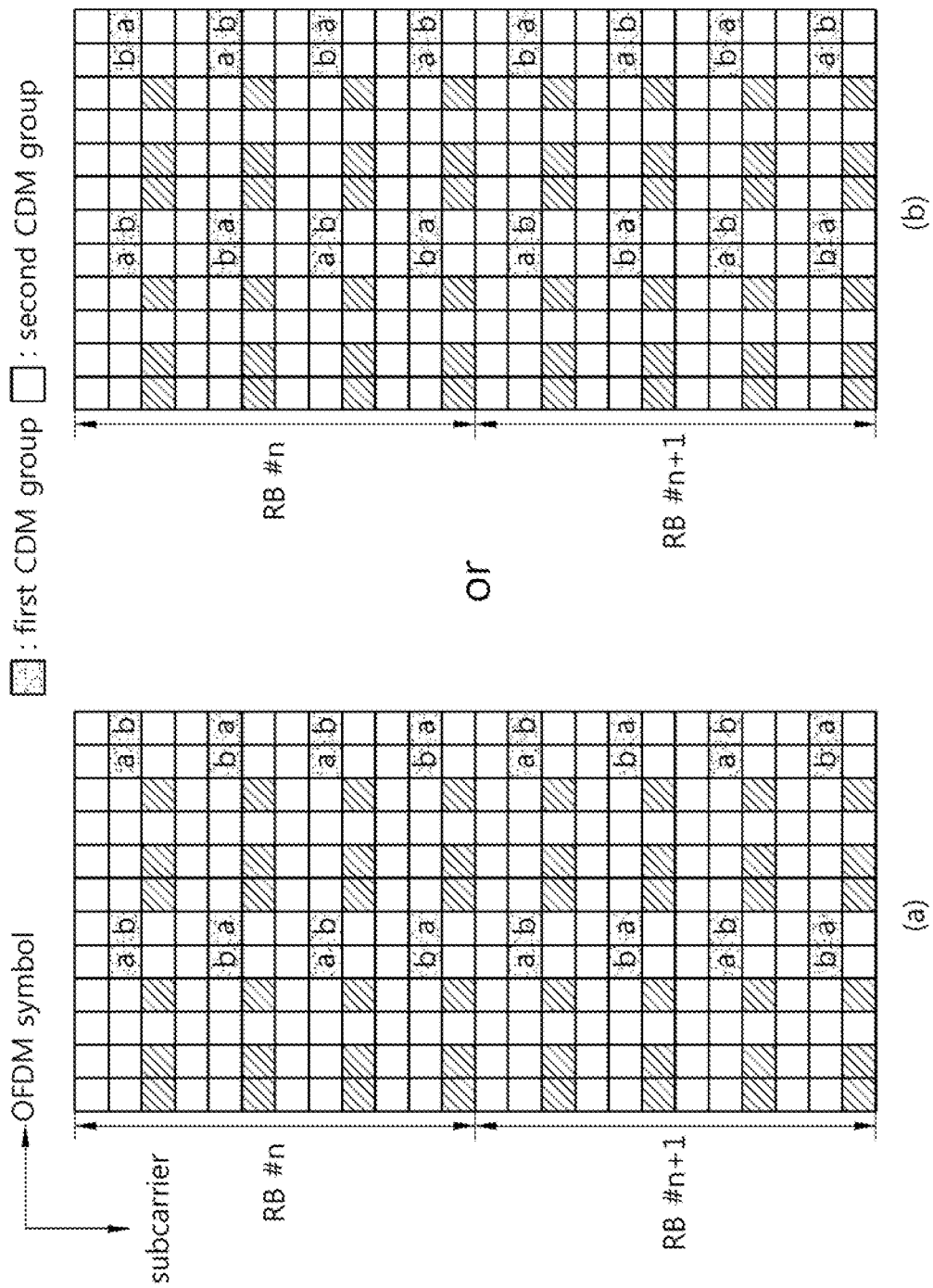
FIG. 17 shows another example of patterns in which DMRSs are mapped to RBs in the LTE-A.

FIG. 17 shows another example of patterns in which DMRSs are mapped to RBs in the LTE-A.

In FIG. 17, in order to solve the imbalance between power of OFDM symbols, OCCs allocated to the DMRSs of respective layers are allocated in interchanged positions in the frequency domain or the time domain. Namely, when an OCC having a length of 2 allocated to DMRSs of two layers is expressed as (a b) as shown in Equation 4, the position of OFDM symbols to which the OCC is allocated is interchanged in the time domain or the frequency domain such that the OCC is allocated in the form of (b a). Referring to FIG. 17(a), the OCC of (a b) is allocated to a DMRS mapped to resource elements of a second subcarrier of the first CDM group like the case of FIG. 14(a), but an OCC of (b a), changing the position of (a b), may be allocated to the DMRS mapped to the resource elements of the fifth subcarrier. Also, the OCC of (a b) is allocated to the DMRS mapped to a resource element of the eighth subcarrier, and the OCC of (b a) may be allocated to the DMRS mapped to the resource element of the eleventh subcarrier. Thus, since the OCC value of −1 allocated to the layer 1 is alternately allocated to the fifth OFDM symbol and the sixth OFDM symbol, unbalance between power of OFDM symbols can be resolved.

Figure 18:
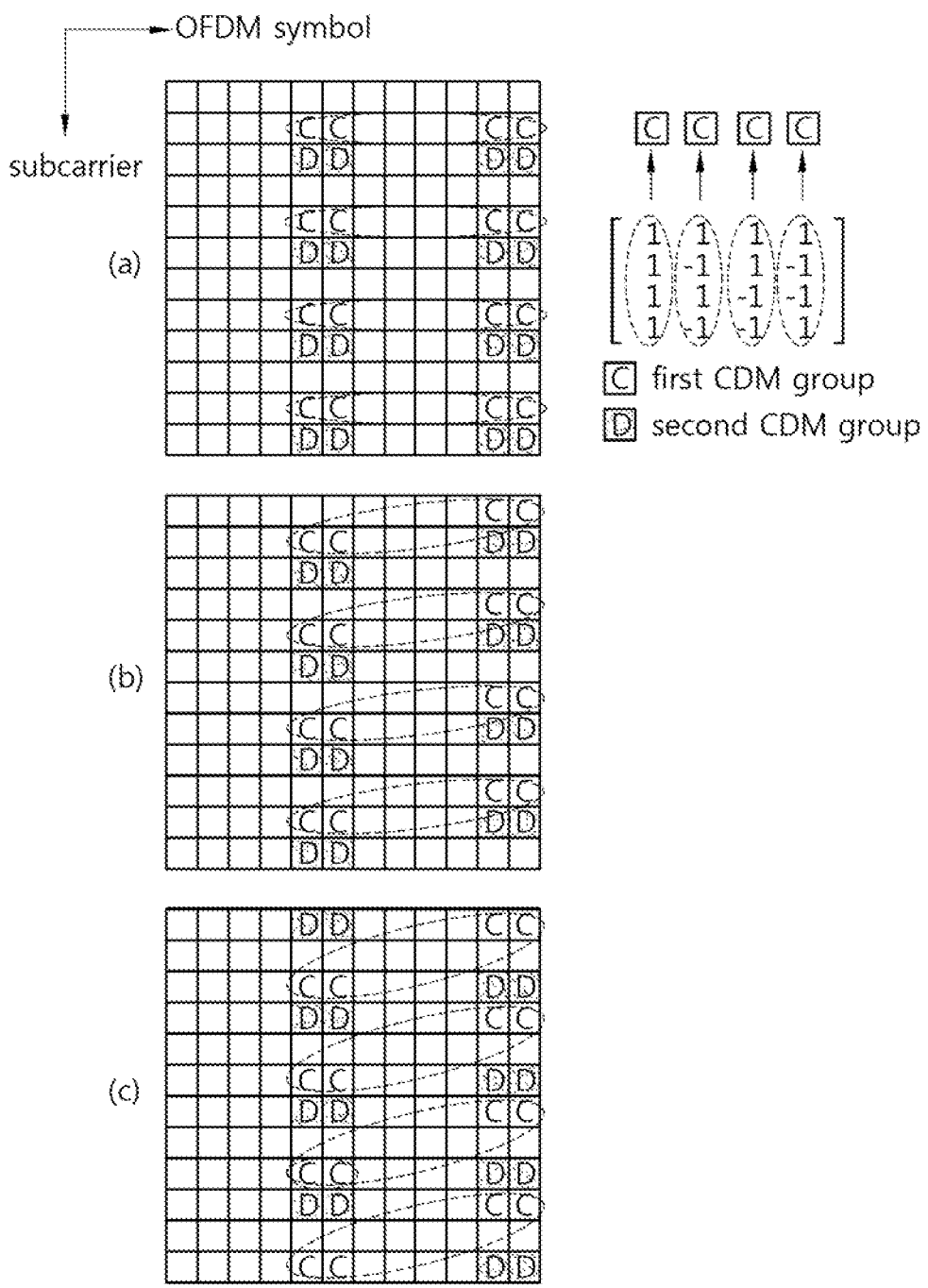
FIG. 18 shows another example of patterns in which DMRSs are mapped to RBs in the LTE-A.

FIG. 18 shows another example of patterns in which DMRSs are mapped to RBs in the LTE-A.

Specifically, FIG. 18 shows patterns for supporting DMRSs with respect to a maximum of eight layers in an extended CP structure. In FIG. 18, like the case of FIG. 13, the first CDM group and the second CDM group include resource elements of fifth, sixth, eleventh, and twelfth OFDM symbols. As shown in FIG. 18(a) to FIG. 18(c), positions of resource elements in the frequency domain included in each CDM group may be various.

DMRSs with respect to layers mapped to the first CDM group and the second CDM group, respectively, may be multiplexed according to a CDM method by an OCC. In multiplexing the DMRSs according to the CDM method, 4×4 Walsh spreading may be used. In FIG. 18, an OCC having a length of 4 applied to the DMRSs of respective layers may be expressed. Different OCCs are applied to the DMRSs of four layers mapped to the first CDM group. For example, an OCC of [1 1 1 1] may be allocated to resource elements of OFDM symbols included in the first CDM group with respect to DMRSs of layer 0 mapped to the first CDM group and transmitted, an OCC of [1 −1 1 −1] may be allocated to resource elements of the OFDM symbols included in the first CDM group with respect to DMRSs of layer 1, an OCC of [1 −1 −1] may be allocated to resource elements of the OFDM symbols included in the first CDM group with respect to DMRSs of layer 2, and an OCC of [1 -1 −1 −1] may be allocated to resource elements of the OFDM symbols included in the first CDM group with respect to DMRSs of layer 3. The OCCs applied to the DMRSs of the respective layers may be denoted by a matrix of Equation 5 shown below.

$$W_4 = \begin{pmatrix} 1 & 1 & 1 & 1 \\ 1 & -1 & 1 & -1 \\ 1 & 1 & -1 & -1 \\ 1 & -1 & -1 & 1 \end{pmatrix} = (a \ b \ c \ d) \quad \text{[Equation 5]}$$

In the matrix of Equation 5, respective rows represent layers. Namely, in the matrix of Equation 5, a first row represents the OCC allocated to the DMRSs of the layer 0, a second row represents the OCC allocated to the DMRSs of the layer 1, a third row represents the OCC allocated to the DMRSs of the layer 2, and a fourth row represents the OCC allocated to the DMRSs of the layer 3. Also, in the matrix of Equation 5, the respective rows represent positions of resource elements to which the OCCs are allocated. For example, in FIG. 18, a value of the first column may be allocated to a DMRS mapped to a fifth OFDM symbol, a value of the second column may be allocated to a DMRS mapped to a sixth OFDM symbol, a value of the third column may be allocated to a DMRS mapped to an eleventh OFDM symbol, and a value of the fourth column may be allocated to a DMRS mapped to a twelfth OFDM symbol.

Figure 19:
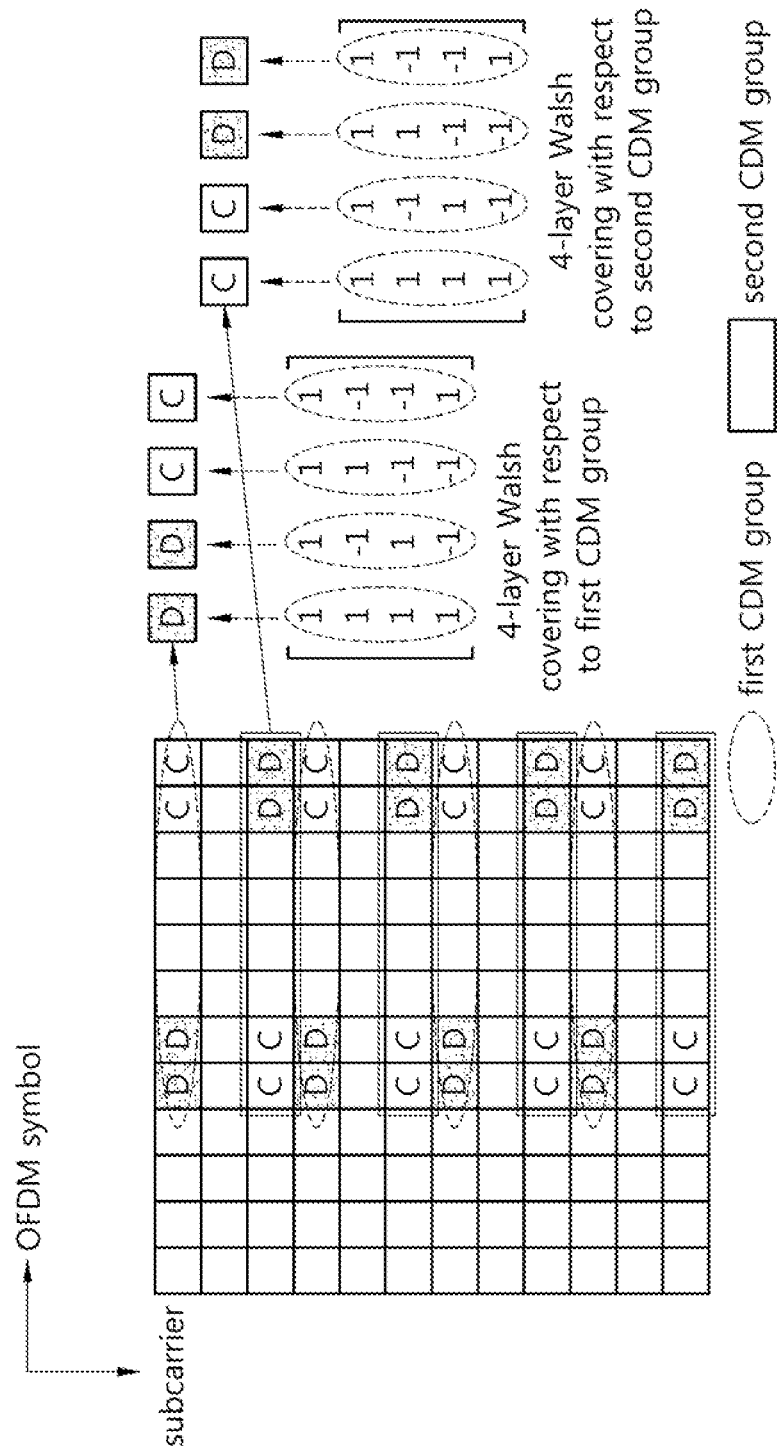
FIG. 19 shows another example of a pattern in which DMRSs are mapped to RBs in the LTE-A.

FIG. 19 shows another example of a pattern in which DMRSs are mapped to RBs in the LTE-A.

Since the OCCs are allocated in this manner, DMRSs of different layers mapped to the same resource element may be discriminated. Even to a DMRS of a layer mapped to the second CDM group, the same OCC as that allocated to a DMRS of a layer mapped to the first CDM group may be allocated.

Table 1 below shows layer indexes, OCCs allocated to DMRSs of corresponding layers, and CDM groups to which the DMRS of corresponding layers are mapped.

TABLE 1

| Layer index | OCC | CDM group |
|---|---|---|
| 0 | [1, 1, 1, 1] | 1 |
| 1 | [1, −1, 1, −1] | 1 |
| 2 | [1, 1, 1, 1] | 2 |

TABLE 1-continued

| Layer index | OCC | CDM group |
|---|---|---|
| 3 | [1, −1, 1, −1] | 2 |
| 4 | [1, 1, −1, −1] | 1 |
| 5 | [1, 1, −1, −1] | 2 |
| 6 | [1, −1, −1, 1] | 1 |
| 7 | [1, −1, −1, 1] | 2 |

For example, a DMRS of layer 0 is mapped to the first CDM group and the OCC of [1 1 1 1] is allocated thereto. A DMRS of layer 1 is mapped to the first CDM group and the OCC of [1 −1 1 −1] is allocated thereto.

In an embodiment of the present invention, DMRSs of a maximum of eight layers are supported, and when an OCC having a length of 4 is applied, the method of allocating OCCs to DMRSs of respective layers by changing the positions in the frequency domain or the time domain in order to solve unbalance between power of OFDM symbols as described above with reference to FIG. 17 is proposed.

Figure 20:
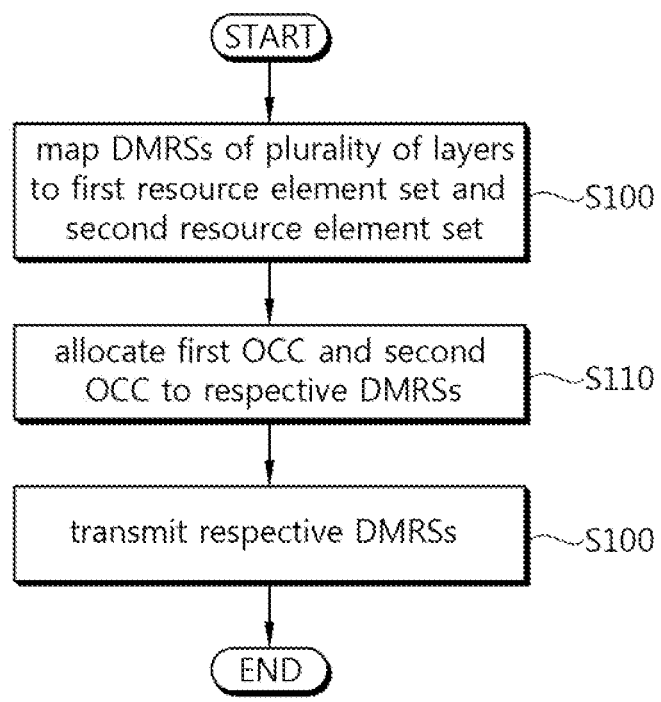
FIG. 20 shows an embodiment of a proposed method for transmitting a reference signal.

FIG. 20 shows an embodiment of a proposed method for transmitting a reference signal.

In step S100, a BS maps respective DMRSs of a plurality of layers to a first resource element set and a second resource element set including four resource elements occupying four OFDM symbols within a subframe. In step S110, the BS allocates the first OCC having a length of 4 to the respective DMRSs mapped to the first resource element set, and the second OCC a length of 4 to the respective DMRSs mapped to the second resource element set. In step S120, the BS transmits the respective DMRSs. Here, the second OCC is obtained by swapping positions of bits forming the first OCC.

Hereinafter, various DMRS patterns to which the proposed method for transmitting a reference signal will be described through examples. In the following description, it is assumed that the OCCs allocated to the DMRSs of the respective layers follow the matrix, i.e., (a b c d) of Equation 5. However, the present invention is not limited thereto and various types of OCCs may be allocated according to predetermined layer groups or respective layers.

Figure 21:
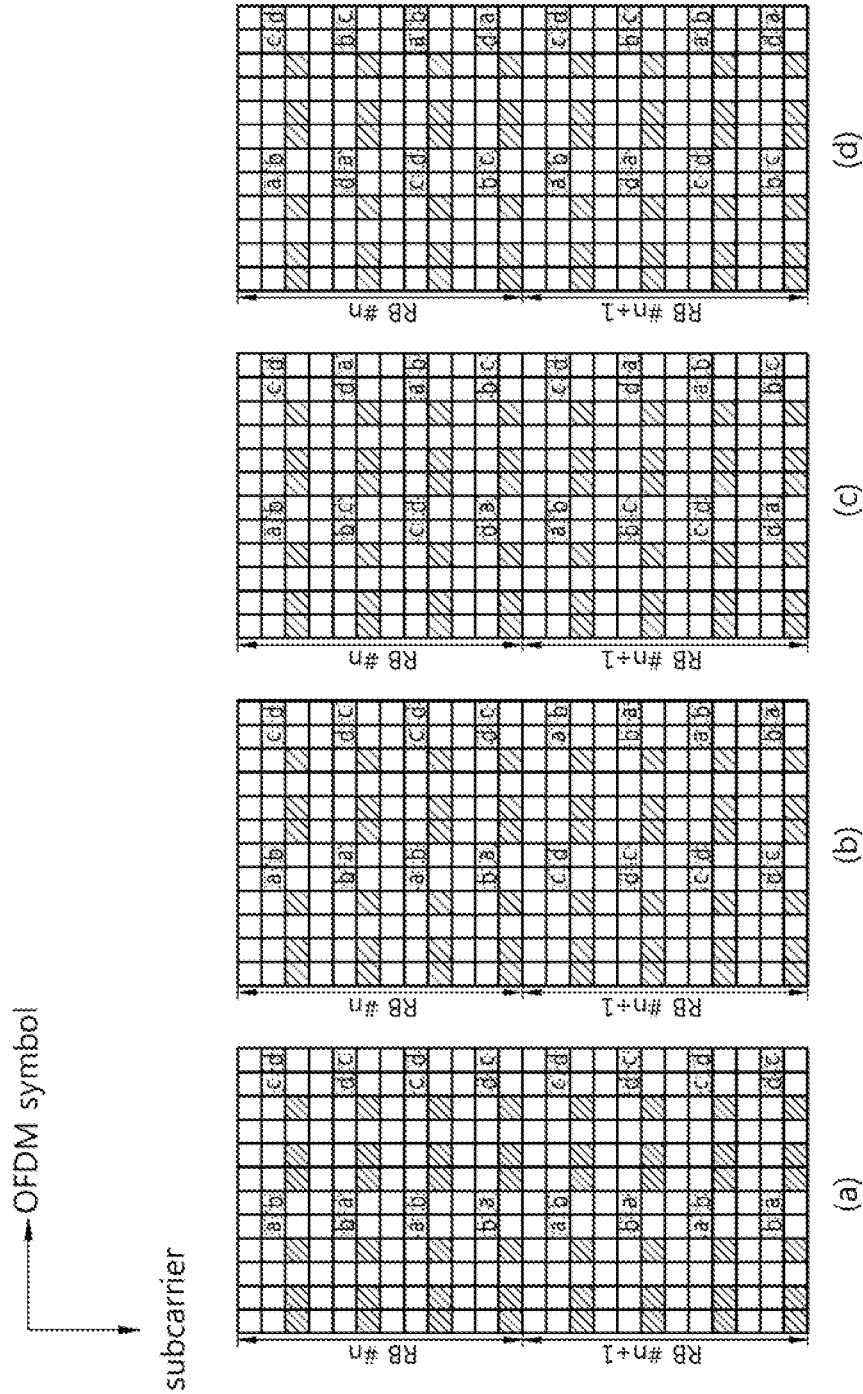
FIG. 21 shows examples of patterns in which DMRSs are mapped to RBs.

FIG. 21 shows examples of patterns in which DMRSs are mapped to RBs. Specifically, FIG. 21 shows a case in which DMRSs of a plurality of layers are mapped to a single CDM group, namely, a case in which DMRSs of up to four layers are transmitted.

In FIG. 21(*a*), OCCs allocated to DMRSs of respective layers are swapped to be allocated only between two adjacent OFDM symbols. Namely, the OCC positions are swapped only in the time domain. OCCs of (a b) and (b a) are alternately allocated to DMRSs mapped to the fifth and sixth OFDM symbols among the resource elements of the fifth, sixth, eleventh, and twelfth OFDM symbols included in the first CDM group, and OCCs of (c d) and (d c) are alternately allocated to DMRSs mapped to the eleventh and twelfth OFDM symbols among the resource elements of the fifth, sixth, eleventh, and twelfth OFDM symbols included in the first CDM group. Thus, the OCCs may be allocated in the same form to all the resource blocks irrespective of resource blocks. Namely, even when a single UE is allocated a plurality of resource blocks, the positions of the OCCs allocated to the DMRSs of the respective layers within the respective resource blocks are the same. In this manner, when the OCCs are swapped to be allocated only within two adjacent OFDM symbols, one OFDM symbol among four allocatable OCCs (a, b, c, d) may be allocated only any one of (a, b) and (c, d). Thus, randomization performance of OCCs is degraded and power may not be evenly distributed to all the OFDM symbols within a subframe.

FIG. 21(*b*) shows a case in which OCCs allocated to DMRSs of respective layers are swapped to be allocated between two adjacent OFDM symbols and between two adjacent resource blocks. Namely, OCC positions are swapped in the time domain and the frequency domain. By allocating OCCs as shown in FIG. 21(*b*), one OFDM may be allocated all of a, b, c, and d. different OCCs are allocated according to resource block indices, and thus, randomization performance of OCCs may be enhanced.

FIG. 21(*c*) and FIG. 21(*d*) also show cases in which OCC positions are swapped in the time domain and the frequency domain. In detail, in FIG. 21(*c*) and FIG. 21(*d*), OCCs applied to respective OFDM symbols are allocated in a cyclic manner. For example, in FIG. 21(*c*), an OCC of (a b c d) is allocated to DMRSs mapped to resource elements of a second subcarrier in the CDM group, and an OCC of (b c d a) is allocated to DMRSs mapped to resource elements of a fifth subcarrier, an OCC of (c d a b) is allocated to DMRSs mapped to resource elements of an eighth subcarrier, and an OCC of (d a b c) is allocated to DMRSs mapped to resource elements of an eleventh subcarrier. Namely, the positions of the OCCs may be swapped as the OCC of (a b c d) is cycled to the left. Similarly, in FIG. 21(*d*), the positions of the OCCs may be swapped as the OCC of (a b c d) is cycled to the right. When the OCCs are allocated as shown in FIG. 21(*c*) and FIG. 21(*d*), the form of allocation of the OCCs is the same in all the resource blocks, irrespective of resource blocks.

The DMRS pattern mapped to the single CDM group of FIG. 21 may also be easily applied to a case in which it is mapped to two CDM groups.

Figure 22:
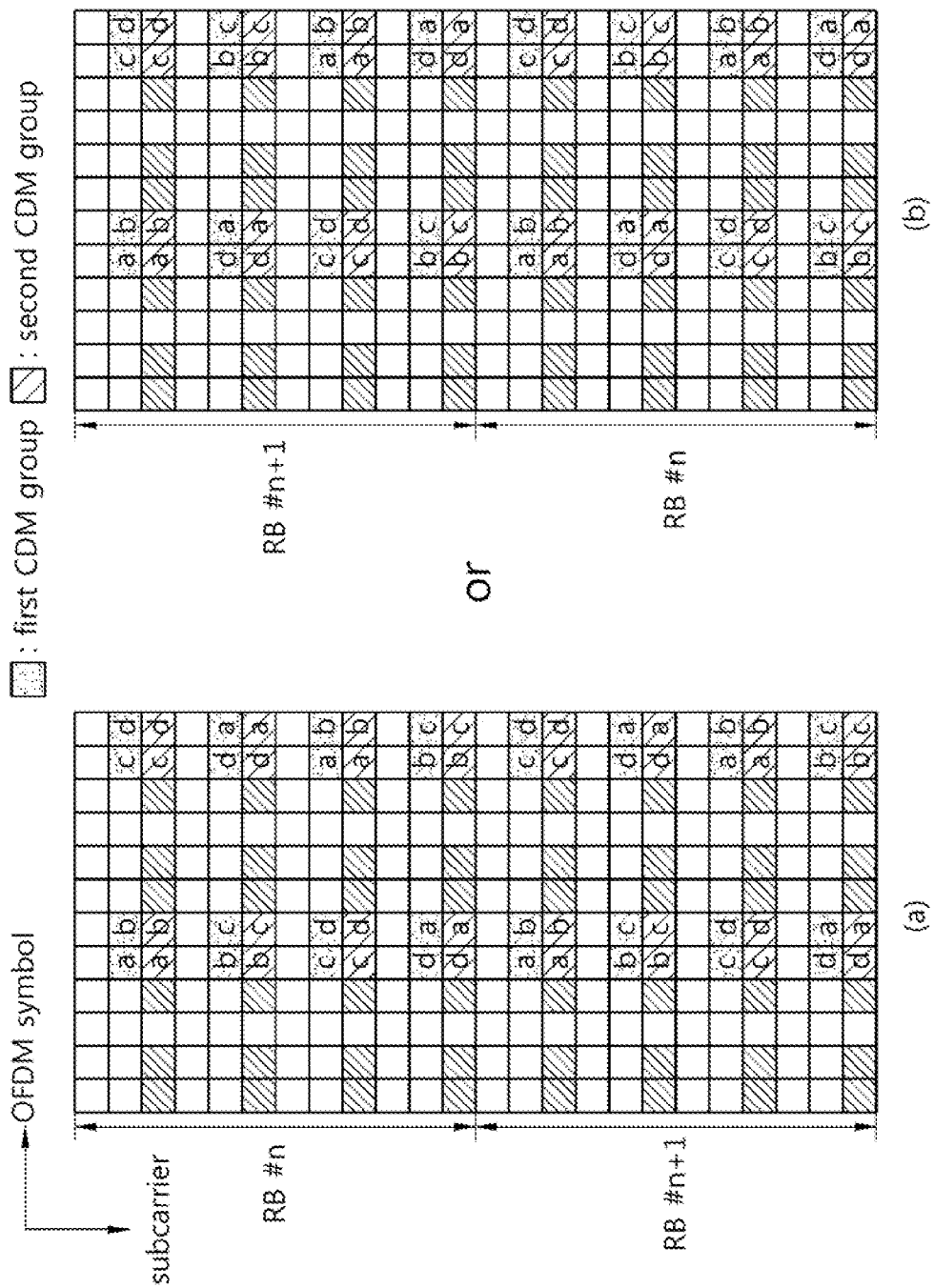
FIGS. 22 to 24 show another examples of patterns in which DMRSs are mapped to RBs according to the proposed reference signal transmitting method.
Figure 23:
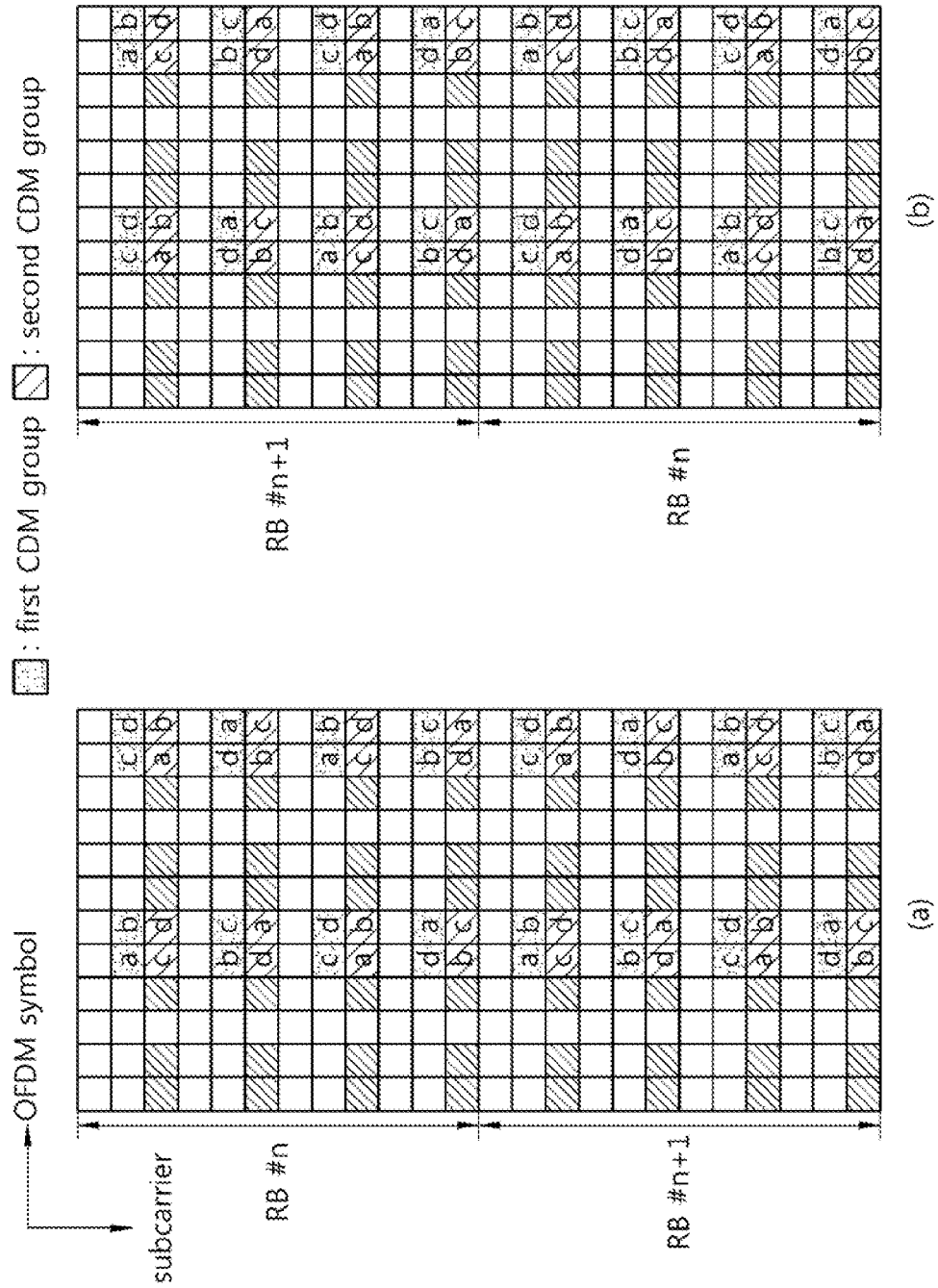
Figure 24:
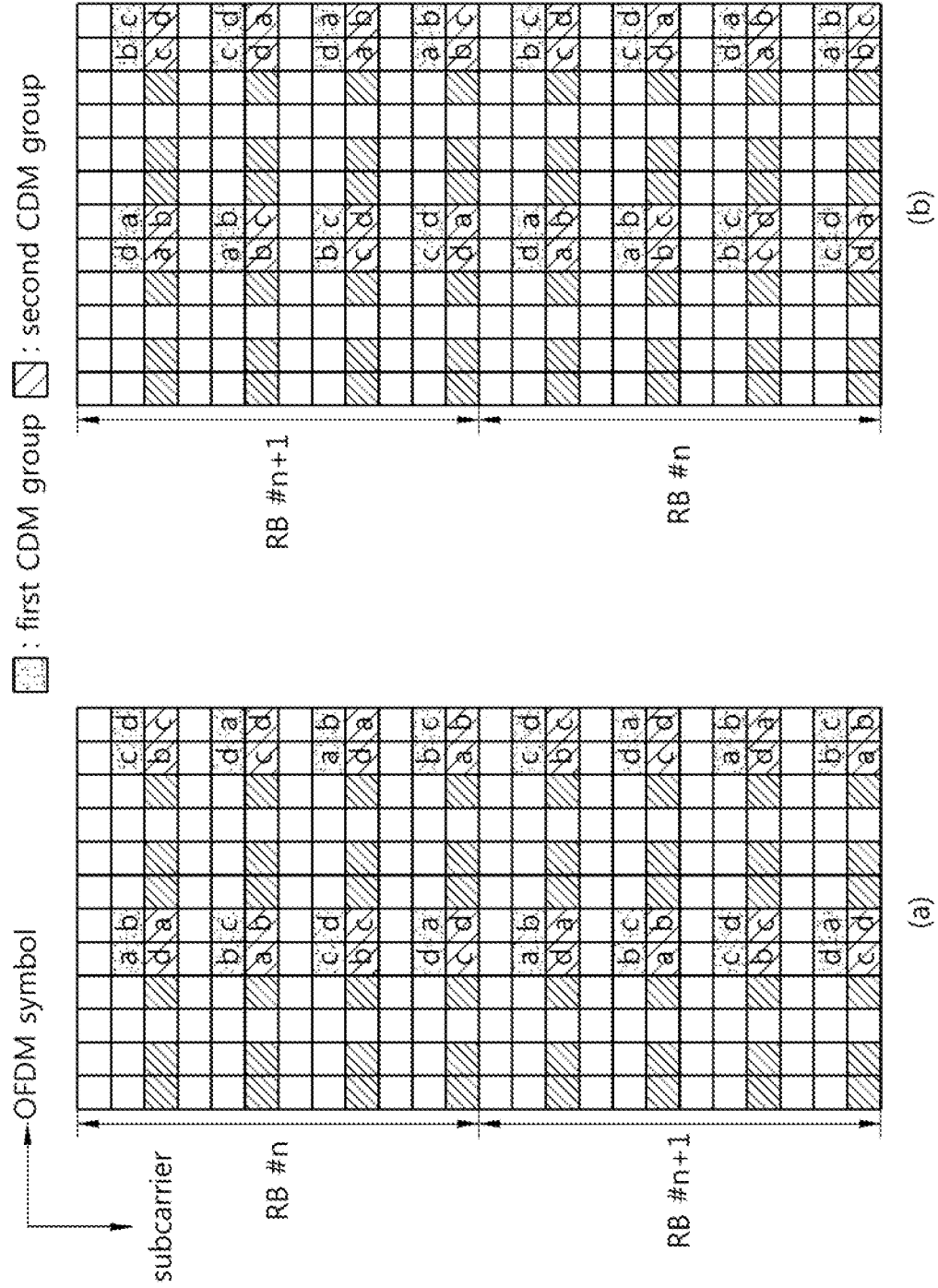

FIGS. 22 to 24 show another examples of patterns in which DMRSs are mapped to RBs according to the proposed reference signal transmitting method. FIGS. 22 to 24 show cases in which DMRSs of a plurality of layers are mapped to two CMD groups, namely, cases in which DMRSs of up to eight layers are transmitted.

FIG. 22 shows a case in which OCCs are allocated in the same manner to the DMRSs mapped to the first CDM group and the DMRSs mapped to the second CDM group. In FIG. 22(*a*), the same type of OCCs as that of FIG. 21(*c*) are allocated to the DMRSs mapped to the first CDM group and the second CDM group, and in FIG. 22(*b*), the same type of OCC as that of FIG. 21(*d*) is allocated to the DMRSs mapped to the first CDM group and the second CDM group.

FIG. 23 shows a case in which an OCC allocated to DMRSs mapped to OFDM symbols within a first slot in a single CDM group and an OCC allocated to DMRSs mapped to OFDM symbols within the first slot are swapped. This may also be expressed as that the OCC allocated to the first CDM group and the OCC allocated to the second CDM group are swapped between slots. For example, the OCC of (a b c d) is allocated to the DMRSs mapped to the first CDM group including resource elements of the second subcarrier in FIG. 23(*a*), and the OCC of (c d a b) is allocated to the DMRSs mapped to the second CDM group including resource elements of the third subcarrier. Also, the OCC of (b c d a) is allocated to the DMRSs mapped to the first CDM group including resource elements of the fifth subcarrier, and the OCC of (d a b c) is allocated to the DMRSs mapped to the second CDM group including resource elements of the third subcarrier. The positions of the resource elements included in the respective CDM groups may be changed. By swapping the positions of the OCCs allocated between slots, randomization performance of the OCCs in transmitting DMRSs by using the two CDM groups may be enhanced. FIG. 23(b) illustrates a pattern of DMRSs swapped by a->c, b->d, c->a, d->b in FIG. 23(a).

FIG. 24(a) shows a case in which the same type of OCC as that of FIG. 21(c) is allocated to the DMRSs mapped to the first CDM group, and the OCC is cycled to the left like the first CDM group, starting from (d a b c), so as to be allocated to the DMRS mapped to the second CDM group. FIG. 24(b) shows a case in which the OCC allocated to the DMRSs mapped to the first CDM group of FIG. 24(a) and the OCC allocated to the DMRSs mapped to the second CDM group are swapped.

Figure 25:
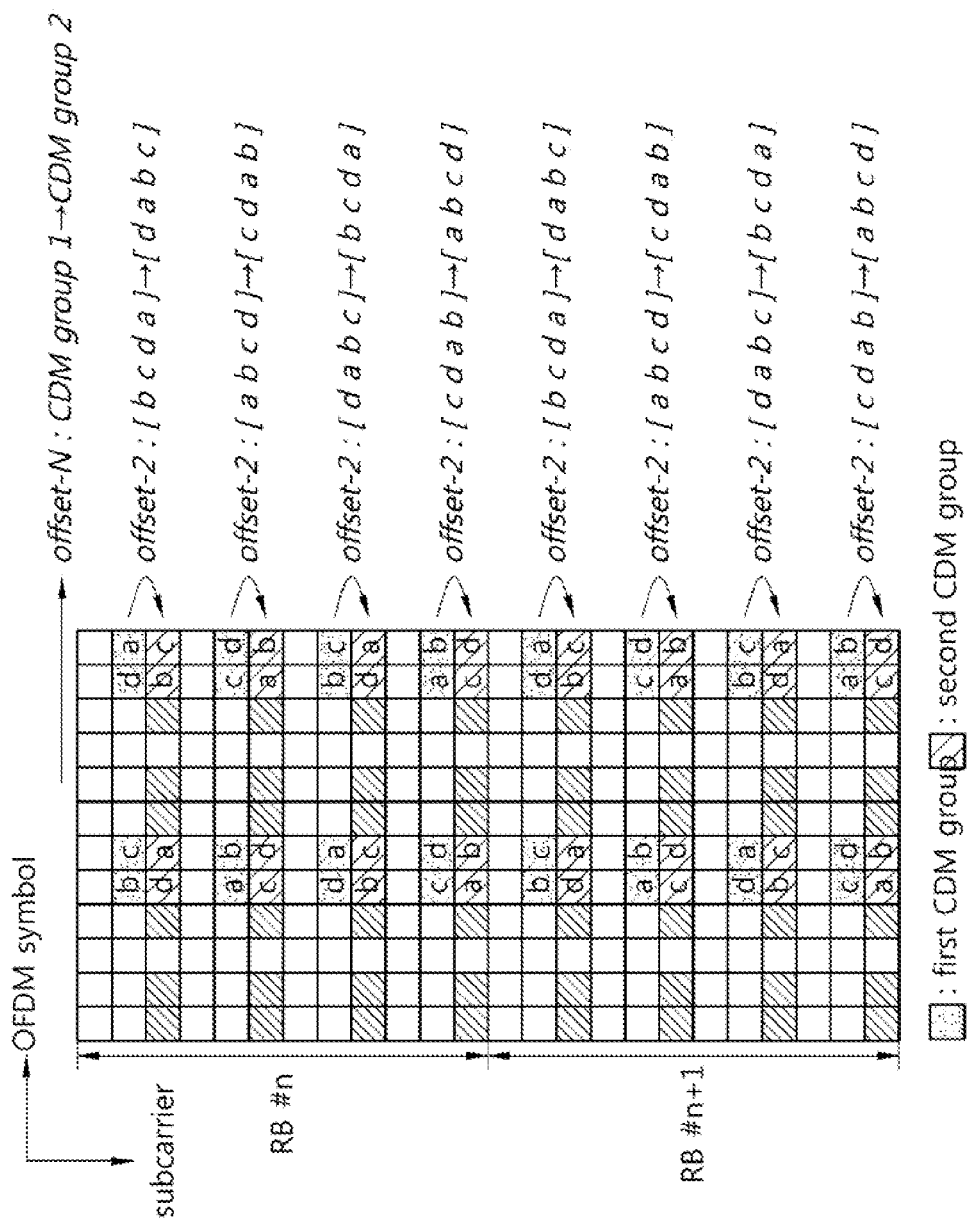
FIG. 25 shows another example in which DMRSs are mapped to RBs according to the proposed reference signal transmitting method.

FIG. 25 shows another example in which DMRSs are mapped to RBs according to the proposed reference signal transmitting method.

In FIG. 25, the OCC allocated to the DMRSs mapped to the second CDM group may be defined as an offset of the OCC allocated to the DMRSs mapped to the first CDM group. Namely, the OCC allocated to the DMRSs mapped to the second CDM group may be determined by cyclic-shifting the OCC allocated to the DMRSs mapped to the first CDM group by the offset. For example, in FIG. 25, when the offset is 2 and the OCC allocated to the DMRSs mapped to the first CDM group is (a b c d), an OCC allocated to the DMRSs mapped to the second CDM group may be (c d a b) obtained by cycling (a b c d) by 2. If the offset is 0, an OCC allocated to the DMRSs mapped to the second CDM group may be the same as the OCC allocated to the DMRSs mapped to the first CDM group. Meanwhile, FIG. 25 shows the case in which the OCC allocated to the DMRSs mapped to the first CDM group is cycled to the right by the offset, but the OCC allocated to the DMRSs mapped to the first CDM group may be cycled to the left by the offset so as to be allocated to the DMRSs mapped to the second CDM group. Namely, in case that the offset 1 is applied to the left, when the OCC (a b c d) is allocated to the DMRSs mapped to the first CDM group, the OCC (d a b c) may be allocated to the DMRSs mapped to the second CDM group. An offset for defining an OCC allocated to the DMRSs mapped to the second CDM group may be previously determined by a BS. Also, in FIG. 25, it is assumed that the offsets are uniform in the frequency domain, but the offsets may be differently designated in the frequency domain in order to enhance randomization performance of the OCCs. Here, offsets may be differently designated in the frequency domain according to a rank or transmission mode.

Figure 26:
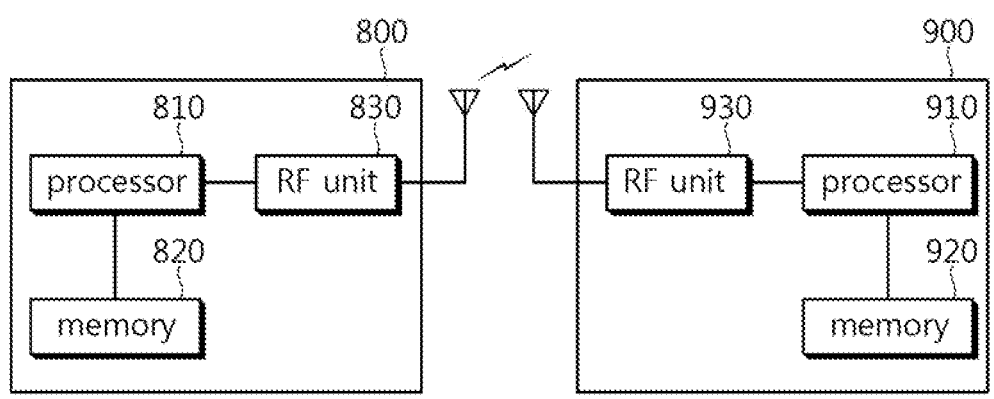
FIG. 26 is a block diagram of a base station (BS) and a user equipment (UE).

FIG. 26 is a block diagram of a base station (BS) and a user equipment (UE).

A BS 800 includes a processor 810, a memory 820, and an RF unit 830. The processor 810 implements the proposed function, process and/or method. The processor 810 is configured to map DMRSs of a plurality of layers to a first resource element set and a second resource element set including four resource element occupying four OFDM symbols within a subframe, respectively, allocate a first OCC having a length of 4 to each DMRS mapped to the first resource element set and a second OCC having a length of 4 to each DMRS mapped to the second resource element set, and transmit each DMRS mapped to the first resource element set and the second resource element set. The subframe includes two slots, each slot includes six OFDM symbols, and the second OCC is obtained by swapping positions of bits forming the first OCC. The memory 820 is connected to the processor 810 and stores various types of information for driving the processor 810. The RF unit 830 is connected to the processor 810 and transmits and/or receives a radio signal.

A UE 900 includes a processor 910, a memory 920, and an RF unit 930. The RF unit 930 is connected to the processor 910 and transmits and/or receives a radio signal. The processor 910 implements the proposed function, process and/or method. Layers of radio interface protocols may be implemented by the processor 910. The processor 910 is configured to receive each DMRS of a plurality of layers mapped to each of a first resource element set and a second resource element set including four resource elements occupying four OFDM symbols within a subframe and transmitted, and process each DMRS to perform data demodulation. The subframe includes two slots, each slot includes six OFDM symbols, a first OCC having a length of 4 is allocated to each DMRS mapped to the first resource element set, and a second OCC having a length of 4 is allocated to each DMRS mapped to the second resource element set, and the second OCC is obtained by swapping positions of bits forming the first OCC. The memory 920 is connected to the processor 910 and stores various types of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art. In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting a reference signal in a wireless communication system, the method comprising:
    mapping demodulation reference signals (DMRSs) of a first plurality of layers to a first resource element (RE) set and a second RE set, the first RE set and the second RE set each including four REs occupying four orthogonal frequency division multiplexing (OFDM) symbols within a subframe;
    mapping DMRSs of a second plurality of layers that is different from the first plurality of layers to a third RE set and a fourth RE set each including four REs occupying four OFDM symbols within the subframe;

allocating a first orthogonal cover code (OCC) having a length of 4 to each of the DMRSs mapped to the first RE set;

allocating a second OCC having a length of 4 to each of the DMRSs mapped to the second RE set;

allocating a third OCC having a length of 4 to each of the DMRSs mapped to the third RE set;

allocating a fourth OCC having a length of 4 to each of the DMRSs mapped to the fourth RE set; and transmitting the mapped DMRSs, wherein the subframe includes two slots each including six OFDM symbols, wherein the fourth OCC is obtained by swapping positions of bits constituting the third OCC, and wherein the second OCC is obtained by swapping positions of bits constituting the first OCC.

2. The method of claim 1, wherein a number of the first plurality of layers is a maximum of 4.

3. The method of claim 1, wherein the four OFDM symbols are fifth, sixth, eleventh, and twelfth OFDM symbols of the subframe.

4. The method of claim 1, wherein the first RE set and the second RE set each include two pairs of REs that include REs corresponding to two adjacent OFDM symbols and a same subcarrier.

5. The method of claim 1, wherein the first RE set and the second RE set each have specific subcarrier intervals within corresponding OFDM symbols.

6. The method of claim 1, wherein the second OCC is obtained by swapping positions of bits constituting the first OCC in a slot unit or a subframe unit.

7. The method of claim 1, wherein the second OCC is obtained by swapping the positions of bits constituting the first OCC by cycling the first OCC left or right.

8. The method of claim 1, wherein the third RE set and the fourth RE set each include two pairs of REs that include REs corresponding to two adjacent OFDM symbols and a same subcarrier.

9. The method of claim 1, wherein:
the first RE set and the third RE set are adjacent in a frequency domain within corresponding OFDM symbols; and
the second RE set and the fourth RE set are adjacent in a frequency domain within corresponding OFDM symbols.

10. The method of claim 1, wherein the third OCC and the fourth OCC are obtained by swapping positions of the bits constituting the first OCC and positions of bits constituting the second OCC left or right according to an offset.

11. The method of claim 10, wherein the offset is predetermined.

* * * * *